United States Patent [19]

Rhonehouse

[11] 4,300,937
[45] Nov. 17, 1981

[54] QUENCH DEVICES, GLASS TEMPERING FURNACES, AND METHODS OF UTILIZING SAME

[75] Inventor: Donald E. Rhonehouse, Cecil, Ohio

[73] Assignee: TGS Systems, Inc., Antwerp, Ohio

[21] Appl. No.: 113,828

[22] Filed: Jan. 21, 1980

Related U.S. Application Data

[63] Continuation-in-part of Ser. No. 43,357, May 29, 1979.

[51] Int. Cl.³ .............................................. C03B 27/00
[52] U.S. Cl. ........................................ 65/114; 65/350; 65/351; 198/790
[58] Field of Search ................. 65/273, 348, 349, 350, 65/351, 114; 198/790

[56] References Cited

U.S. PATENT DOCUMENTS

| | | | |
|---|---|---|---|
| 2,348,887 | 5/1944 | Drake | 65/273 X |
| 2,528,865 | 11/1950 | Dale | 65/273 X |
| 3,344,903 | 10/1967 | Holm | 198/790 |
| 3,672,861 | 6/1972 | Ritter, Jr. et al. | 65/114 X |
| 3,806,331 | 4/1974 | Bezombes | 65/351 |
| 3,994,711 | 11/1976 | McMaster | 65/349 X |
| 4,028,086 | 6/1977 | Rahrig et al. | 65/351 X |
| 4,133,667 | 1/1979 | Nitschke | 65/348 X |
| 4,167,997 | 9/1979 | Revells | 65/273 X |
| 4,204,845 | 5/1980 | Shields et al. | 65/114 X |

OTHER PUBLICATIONS

Heat Technology, Fall 1979, pp. 3-18, Selas Corp. of America, Box 200, Dresher, PA 19025

*Primary Examiner*—Arthur D. Kellogg
*Attorney, Agent, or Firm*—Irving M. Weiner; Pamela S. Burt; John L. Shortley

[57] ABSTRACT

Primary and secondary quench sections and radiant electrical heaters for a roller hearth glass tempering furnace having a roller track supporting the endless conveyor drive belts, and adjustable locators for conveyor roller spacing. At least the primary quench section includes high flow, low suction air cooling devices. The heating zone size may conform to the size of the glass part being treated. Optionally, the glass part may be reciprocated five inches or less in either direction while being heated or cooled. Fully adjustable roller and drive belt support systems control the horizontal plane of the track and thus maintain a more level conveyor bed. A unitized zone construction allows for future increase or decrease in product output, simply by installation of one or more heating zones and lengthening of drive belts. A wear-resistant, disposable Teflon and/or silicone axle can be used. The furnace incorporates soft, heat-resistant fabric belts which are Teflon and/or silicone rubber coated.

39 Claims, 39 Drawing Figures

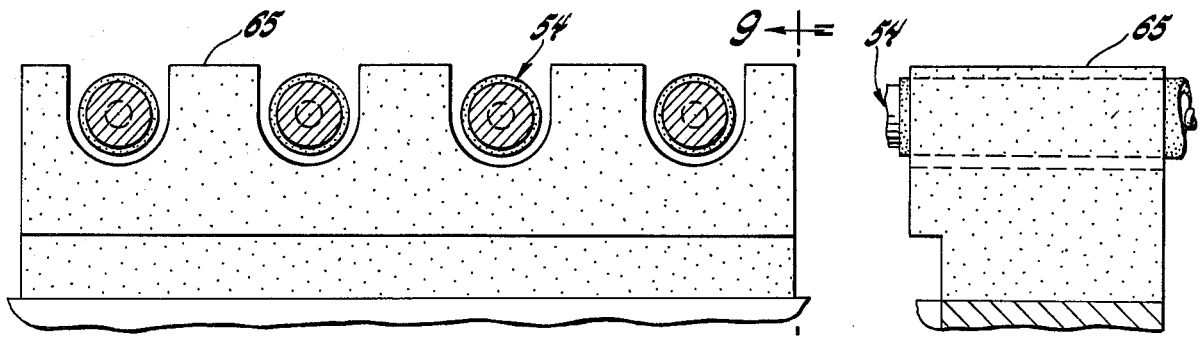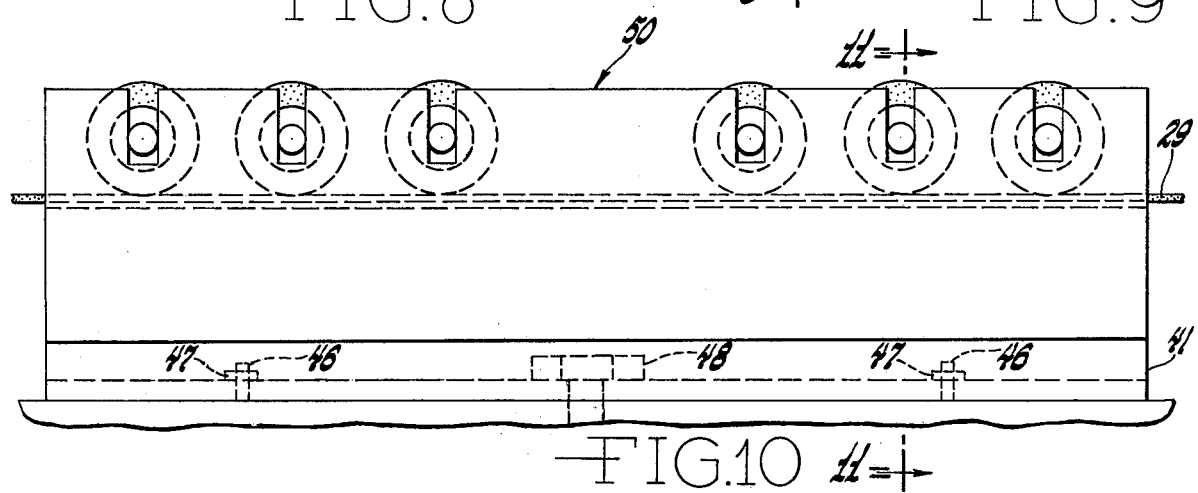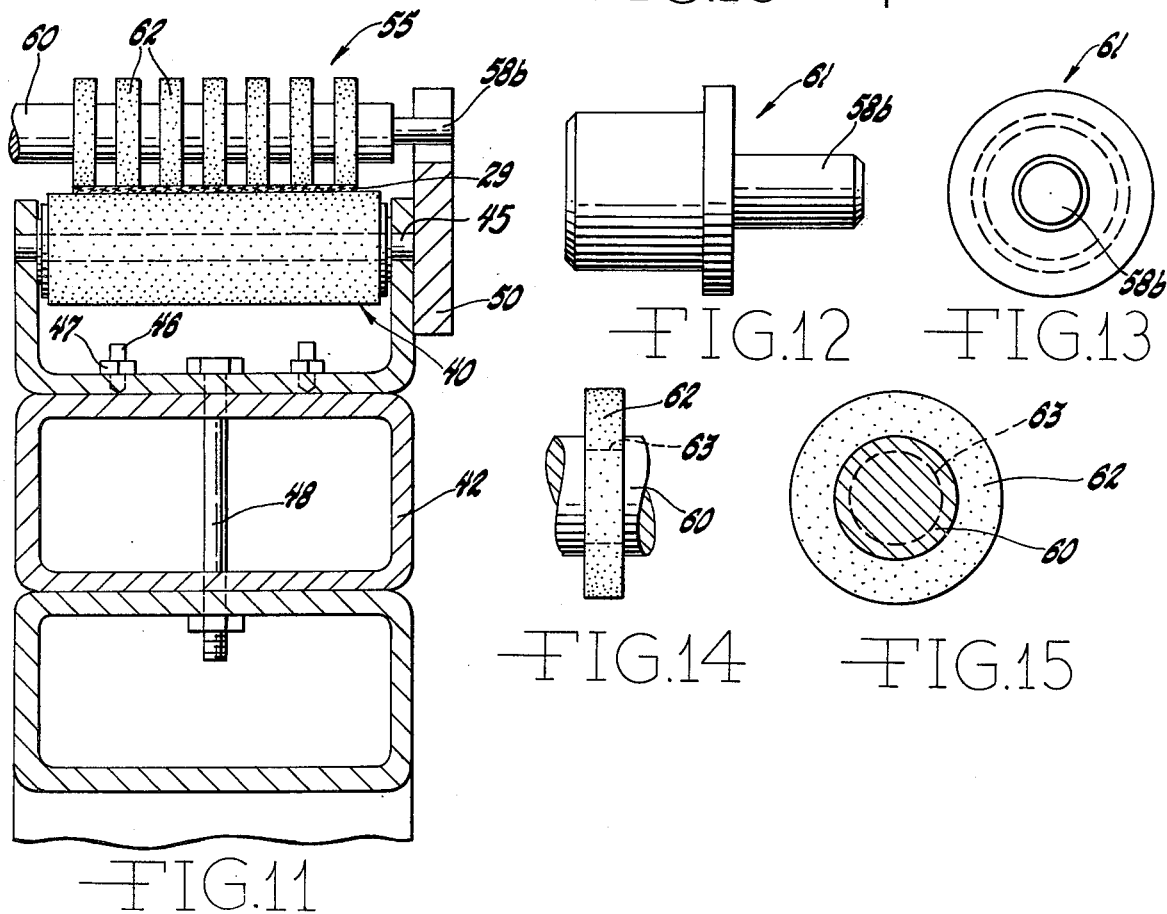

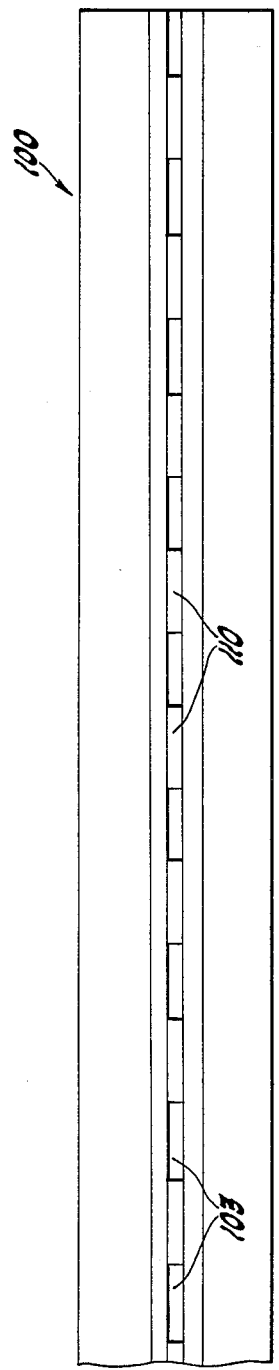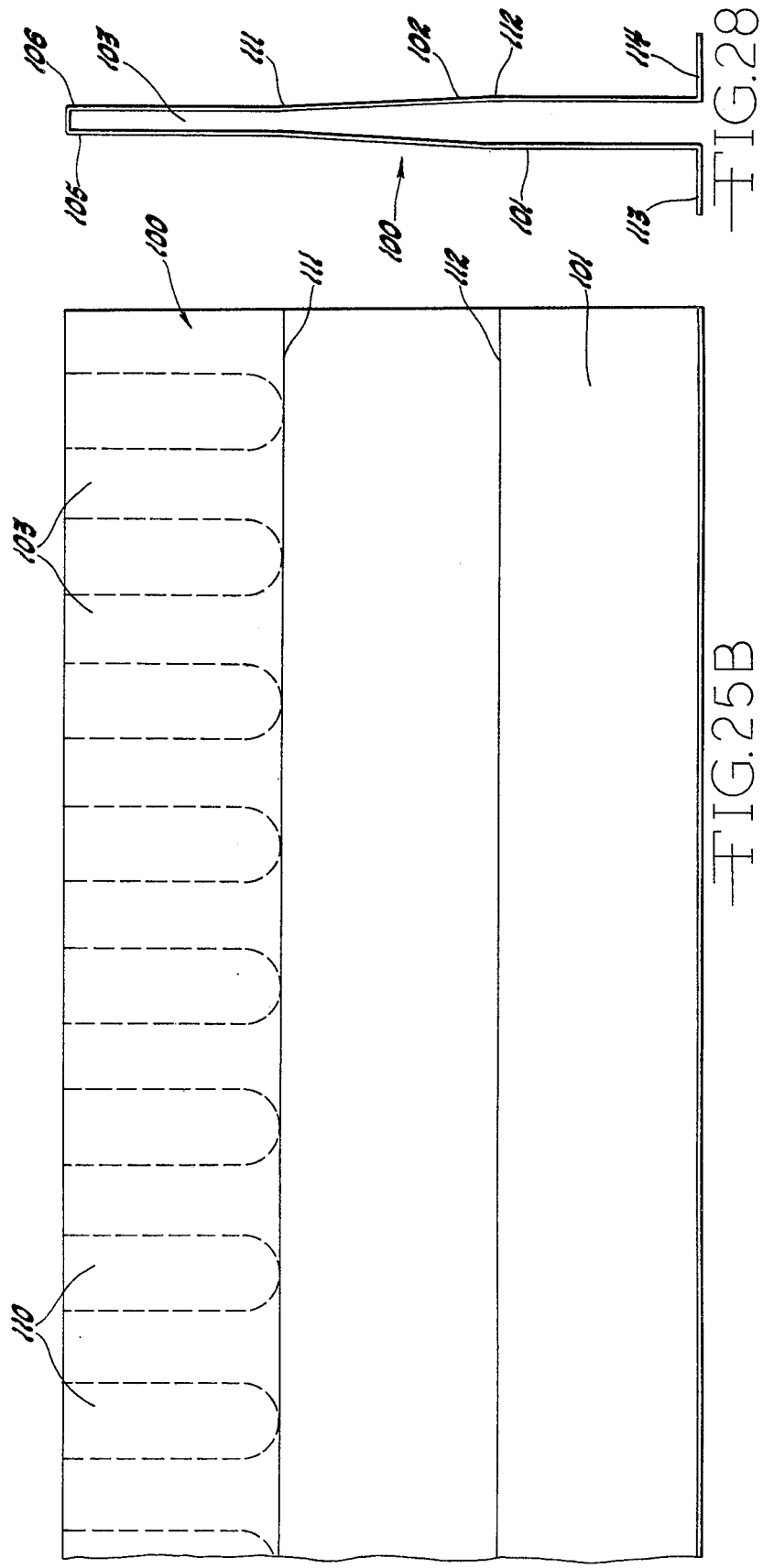

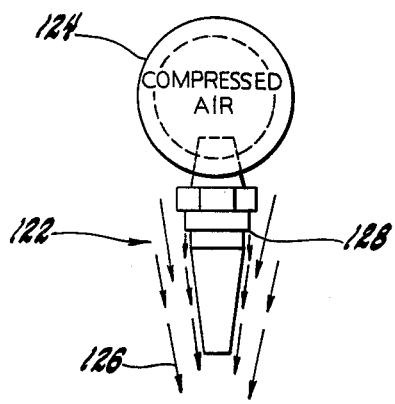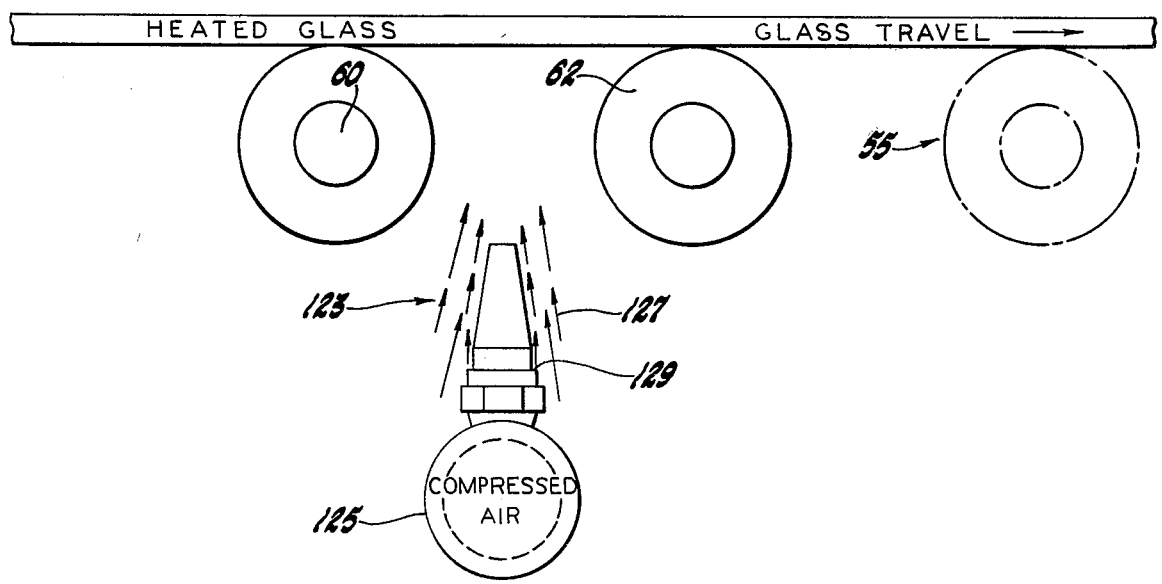
FIG. 29

QUENCH DEVICES, GLASS TEMPERING FURNACES, AND METHODS OF UTILIZING SAME

CROSS-REFERENCE TO RELATED APPLICATION

The present application is a continuation-in-part of U.S. Patent Application, Ser. No. 43,357, filed on May 29, 1979, which is incorporated herein by reference thereto.

The present invention relates generally to quench devices, glass tempering systems, novel sections and components thereof.

BACKGROUND OF THE INVENTION

The purpose of annealing glass is to remove internal stresses that might cause later breakage. Stresses are likely to be present because of unequal temperature distribution in the glass article while it is being made. Glass that has not been annealed may shatter from tension caused by uneven cooling. Annealing is done by reheating the glass and then gradually cooling it according to a planned time-and-temperature schedule.

A somewhat related treatment is the process of tempering glass. Tempering is a process in which a glass article that is already formed is reheated until almost soft. Then, under carefully controlled conditions, it is chilled suddenly by blasts of cold air, or alternatively by plunging it in oil or certain chemicals in a liquid state. This treatment makes the glass much stronger than ordinary glass. Glass which has been tempered may be up to five times as hard as ordinary glass.

Glass articles may be annealed or tempered by placing them on a metal belt which travels slowly through a heated enclosure called a lehr. Many lehrs measure four to eight feet wide inside and sixty to one hundred feet long.

Flat glass is used primarily for windows, but also finds uses in mirrors, room dividers, and many types of furniture. All flat glass is made in the form of flat sheets. However, some of it, such as that used in automobile windshields, is reheated and curved or sagged over molds. Flat glass can be classified as sheet glass, plate glass, and float glass.

Sheet glass is used in windows in most stores and offices. Plate glass and float glass are used where exceptionally clear and accurate vision is needed, as in automobile windshields and display windows. Sheet glass is taken from the melting furnace with a fire-polished surface and is given no additional treatment. Plate glass is sheet glass that has been carefully ground and polished to smooth the surface. Float glass is made by floating a ribbon of glass on the surface of molten metal instead of going through rollers and being ground and polished. This produces smoother, and more perfectly parallel surfaces. Both sides of the glass come out with a brilliant fire-polished finish.

Tempered safety glass is a single piece of glass that has been given a special heat treatment. It looks, feels, and weighs the same as ordinary glass. However, it can be up to five times as strong as ordinary glass. Tempered glass is used widely for glass doors in stores, for the side and rear windows of automobiles, and for other special purposes. It is hard to break even when hit with a hammer. When it does break, the whole piece of glass collapses into small, dull-edged, relatively harmless fragments.

Many different systems have been suggested in the past in order to accomplish the tempering of glass sheets and other items. Some of the glass tempering systems which have been suggested previously are discussed hereinbelow.

McMaster et al U.S. Pat. No. 3,015,910 discloses a toroidal furnace with a rotary conveyor extending through the inner wall of the furnace. The conveyor moves intermittently, while fans circulate heated air to the bottom of glass supported on a frame. The blast head has box-like jaws which close when heated glass is in position. The glass is subjected to oscillating air jets connected to a fan.

Nitschke et al U.S. Pat. No. 3,087,316 discloses an interrupted toroidal furnace, with a Geneva-type mechanism to index a rotary conveyor, open and close doors of individual furnace sections, and pull a blast head radially inward. The blast head oscillates when in position, and is fitted with air jets perpendicular to a curved glass surface, arranged in staggered rows of diagonally-oriented parallelograms elongated in the direction of oscillatory movement. Molds for bending the glass as it softens in the furnace have weighted members which press against the under surface of the glass.

Nitschke et al U.S. Pat. No. 3,130,032, discloses an interrupted toroidal furnace, where glass to be treated hangs vertically from tongs. A series of sliding plates cover the opening in the top of the furnace. A continually-oscillating blast head is intermittently supplied with pressurized air.

McMaster et al U.S. Pat. No. 3,249,415 relates to the use of independent conveyor systems in a linear furnace, and an overhead conveyor to return a mold and finished part to a loading and unloading station. Bending of the glass is controlled by the gas pressure supplied to a burner adjacent a bend area in the glass. The conveyors are controlled by photocells sensing that the desired bending has occurred.

McMaster U.S. Pat. No. 3,253,899 discloses the use of heat-sensitive tension tapes to separate the mold from the glass.

McMaster U.S. Pat. No. 3,281,229 relates to the use of an independent support system for a shaped ceramic bed, perforated for the passages of gases to support, heat and form glass sheets.

McMaster et al U.S. Pat. Nos. 3,332,759, 3,338,697 and 3,399,042 relates to use of shutters to control circulation in a gas support bed furnace, the use of varying patterns of perforations in the bed, and a conveyor system which cooperates with a tilted bed to frictionally engage the lowermost edge of the glass.

McMaster U.S. Pat. No. 3,353,946 discloses a blast head structure where cooling air provides a centering force to a vertically-suspended glass sheet.

McMaster et al U.S. Pat. No. 3,423,198 discloses the use of particles of materials in tempering media to vary the thermal conductivity of the media.

McMaster et al U.S. Pat. Nos. 3,455,669, 3,455,699 and 3,455,671 disclose a blast head structure for supporting s sheet of glass on the cooling air.

McMaster U.S. Pat. No. 3,485,612 relates to an inclined heating support bed, and structure for oscillating a floating glass sheet by pushing it with fingers responsive to contact with the glass sheet.

Nitschke U.S. Pat. No. 3,485,616 discloses the use of sheet members interposed between frictional drive rollers and the edges of the glass to be treated.

McMaster U.S. Pat. No. 3,488,173 relates to an apparatus for oscillating a sheet of glass supported on a gas support bed. A tilted bed and vertical-axis drive rollers contact the lowermost edge of the glass sheet, where the rotation of the rollers is controlled by a feedback control system to produce constant accelerations and decelerations. Separate structure oscillates the rollers transverse to the axis of the bed.

U.S. Pat. Nos. 3,574,588, 3,700,425, 3,723,085 and 3,607,200 disclose a loop chain fitted with pusher bars extending into the furnace to push sheets of glass into a shuttling carrier. A shuttling frame removes the glass from the carrier, raises it against a mold, and conveys it to a blast head.

McMaster U.S. Pat. No. 3,607,187 relates to a vacuum mold which is lowered to pick up a sheet of heated glass, and shape it. The glass is then either moved to a blast head, or to a frame which moves it to a blast head, where it is removed from the frame and oscillated.

McMaster et al U.S. Pat. No. 3,806,312 discloses a conveyor system including a pair of metal belts which slide on two rows of flat ceramic blocks inside the furnace and rotate rollers disposed on top of the belts and trapped between projections from the ceramic blocks.

Dale U.S. Pat. No. 2,528,865 discloses a drive for an endless belt, and a conveyor unit employing such a belt drive. Dale intends to provide a belt drive which may be used with complete indifference to the amount of slack in the belt, and without making any compensation for the same. Also, Dale provides tensioning means in the drive which serves to adjust the same for different belt thicknesses.

Drake U.S. Pat. No. 2,348,887 discloses a method of bending glass sheets which includes directing a continuously moving sheet, heated to the desired temperature, substantially horizontally between oppositely disposed sheet contacting elements, and progressively bending the sheet to a predetermined curvature as succeeding portions of the sheet pass beyond and out of engagement with the contacting elements, and while other portions are still engaged thereby.

Nitschke U.S. Pat. No. 4,133,667 discloses a conveyor drive mechanism wherein a glass plate is supported on a plurality of elongate rollers that extend between the first and second conveyor drives and have their opposed ends supported on and in frictional engagement with the separate continuous drive loops. A first torque source applies drive torque to first pulleys, and a second counter-torque source applies a counter-torque to second pulleys. It is Nitschke's intention for the cooperative effect of the first and second sources to provide at least a minimum, predetermined level of tension in the active areas of the continuous drive loops at all times.

Revells U.S. Pat. No. 4,167,997 discloses a quick connect-disconnect coupling assembly detachably connecting the inner core member of a composite type conveyor roll to its mounting. It is Revells' intention to expedite roll core removal and/or replacement. The coupling assembly includes a tubular drive extension, a first coupling section rigidly secured to the core member, and a second coupling section mounted within the drive extension.

Holm U.S. Pat. No. 3,344,903 discloses a live roller conveyor with adjustable means for changing the angles of the belt actuator rollers relative to the direction of travel of the belts whereby the elongated reach of the belt in contact with the load-supporting rollers may be caused to track properly.

Bezombes U.S. Pat. No. 3,806,331 discloses a glass treatment apparatus including a tunnel furnace having ports for the admission and discharge of flat glass, conveyor means extending between the ports, and means to exclude air from entry through the discharge port comprising a port lip closely approaching a roller of the conveyor means from the load. The apparatus also includes an upper roller above the conveyor roller, gate means closely approaching the upper roller from above, means to adjust the spacing of the rollers, and means to adjust the spacing of the upper roller and the gate means.

U.S. Pat. Nos. 3,173,273, 3,208,229, 3,654,768 and 4,046,492 are believed to relate to various air flow devices, which might be relevant to the various air quench devices mentioned hereinbelow.

McMaster et al U.S. Pat. No. 3,947,242 relates to a horizontal cylindrical furnace fitted with the conveyor disclosed in McMaster et al U.S. Pat. No. 3,806,312. The upper portion of each furnace section is hung from counterbalanced chains, so that it can be moved from a lower, closed, operating position, to an upper, open, non-operating position by manual actuation of an associated handle.

McMaster U.S. Pat. No. 3,994,711 discloses a furnace with separate loading, heating, quenching and unloading conveyors. The load and unload conveyor rollers are lifted from drive chains to stop the conveyors. The furnace conveyor oscillates a distance at least twice the length of the glass load, and is constructed as shown in McMaster et al U.S. Pat. No. 3,806,312 but differing in the location and material of the sliding surface for the metal drive chains.

U.S. Pat. Nos. 1,856,658, 1,856,669 and 1,879,998 disclose glass treating systems which incorporate horizontal roller conveyors. These conveyors carry sheets of glass having discrete lengths horizontally through elongated furnaces which have a decreasing temperature gradient in a direction along which the glass is conveyed. The conveyor rollers are alternately rotated in a forward and rearward rotation so that the glass is conveyed along the decreasing temperature gradient in a "two steps forward and one step backward" manner to provide thereby appropriate heat treating of the glass. Such a furnace requires a large number of reversals of the direction of roller rotation in order to provide the proper treatment of the glass.

Bornor U.S. Pat. No. 3,447,788 relates to a furnace having a horizontal roller conveyor which reciprocates a workpiece to be heated a slight amount in order to avoid the concentration of heat on the same areas of the workpiece. The purpose of this reciprocation is to ensure uniform heating of the work piece within the furnace and to prevent sagging when the workpiece being procssed is in the fluid state.

Other previous suggestions are disclosed in Drake U.S. Pat. No. 2,140,282 and Littleton U.S. Pat. No. 2,326,044.

A basic problem with present glass cooling systems, and also with cooling systems for other materials, such as sheet metal, is the need for both high quantities of coolant, such as air, liquids, etc., at substantial velocities. In recent years, it has become necessary to cool products more quickly, and has thus greatly increased the need for both velocity and quantity of coolant.

While increasing the velocity and quantity of coolant has been accomplished to a certain degree, unfortunately there has also been a commensurate increase in the noise level to the point where the noise level has become virtually unbearable. For example, most conventional cooling systems for glass with a thickness of approximately one-eighth inch operate in the approximate noise level range of 115 decibels. However, the allowable OSHA noise level is only 90 decibels maximum.

Many attempts have been made to quiet this process, but have been substantially unsuccessful, even where OSHA citations have been issued.

The present invention overcomes various deficiencies and problems with respect to the previous suggestions outlined above, and also with respect to commercially-available equipment.

SUMMARY OF THE INVENTION

The present invention provides a method of heating and quenching workpieces, comprising the steps of placing the workpieces upon a load conveyor, and thereafter moving the workpieces into a heating section for a predetermined period of time. Thereafter the workpieces are moved from the heating section into a primary quench section. The heated workpieces are then cooled in the primary quench section by subjecting the heated workpieces to the air flow produced by one or more high flow, low suction air cooling devices. Thereafter the workpieces are moved into a secondary quench section for further cooling of said workpieces. The method further comprises the steps thereafter moving the workpieces into an unload section, and then unloading the finished workpieces.

The present invention also provides a system or apparatus which comprises a furnace having an upper furnace section and a lower furnace section defining a horizontally elongated heating chamber. The system or apparatus also includes a plurality of heating means disposed within the upper furnace section. First frame means supports the upper furnace section, and second frame means supports the lower furnace section. A plurality of adjustable first roller support means are disposed upon an upper surface of the second frame means. An endless flexible belt is supported at least in part by the first roller support means. A plurality of first elongated ceramic rollers are spaced along the length of the elongated heating chamber. The first elongated rollers are supported by the endless flexible belt, and extend into and through the heating chamber. The first elongated rollers are provided with non-metallic cylindrical pins frictionally retained in apertures provided in either end of the elongated rollers coaxial with the axis of the rollers. Adjustable guide members are provided with at least one elongated aperture therethrough for receiving one of the cylindrical pins retained in a first elongated roller.

A load section includes third frame means connected to the second frame means. A plurality of the first adjustable roller support means are disposed on an upper surface of the third frame means. The endless belt is supported upon the latter first adjustable roller support means. Second elongated rollers are driven by the endless belt. The second elongated rollers are provided with ends having a pin adapted to be rotatably received through an aperture of an adjustable guide member.

Primary and secondary quench sections are provided which include a plurality of the adjustable roller support means for supporting a portion of the endless belt. The primary quench section includes high flow, low suction air cooling devices. The secondary quench section includes air cooling devices. There is also provided drive means for the endless belt, including control means for causing the belt to alternately rotate the first and second elongated rollers in a first direction and then in an opposite direction for an electronically adjustable extent of rotation and for an adjustable speed of rotation, and to cause an extended unidirectional rotation of the first and second support rollers at an adjustable speed after a predetermined number of the alternate rotations, so that a workpiece placed upon the second elongated rollers in the load section will be conveyed into the heating chamber, adjustably oscillated at a plurality of predetermined locations within the furnace, conveyed to and oscillated within the quench sections, and conveyed to the unload section.

The present invention also provides novel methods, systems and apparatus of the aforedescribed type, but wherein no such oscillations or reverse directions of motions are required. These form alternate embodiments of the present invention.

The phraseology "workpiece" and "workpieces" as used herein is intended in its broadest sense to include workpieces composed of various materials and substances including, but not limited to, glass, metal, plastics, ceramics, vitreous products, thermoplastic materials, thermosetting materials, etc.

The present invention also provides a glass tempering system including a furnace having an upper furnace section and a lower furnace section defining a horizontally-elongated heating chamber. The system also includes a plurality of heating means disposed within the upper furnace section. This system also includes first frame means for supporting the upper furnace section, and second frame means for supporting the lower furnace section. A plurality of adjustable first roller support means are disposed upon an upper surface of the second frame means. An endless flexible belt is supported, at least in part, by the first roller support means. A plurality of first elongated ceramic rollers are spaced along the length of the elongated heating chamber. The first elongated rollers are supported by the endless flexible belt, and extend into and through the heating chamber. The first elongated rollers are provided with non-metallic cylindrical pins frictionally retained in apertures provided in either end of the elongated rollers coaxial with the axis of the rollers. Adjustable guide members are provided with at least one elongated aperture therethrough for receiving one of the cylindrical pins retained in one of the first elongated rollers. A loading section includes third frame means connected to the second frame means. A plurality of the first adjustable roller support means are disposed on an upper surface of the third frame means. The endless belt is supported upon the first adjustable roller support means. Second elongated rollers are driven by the endless belt. The second elongated rollers are provided with ends having a pin adapted to be received through an aperture of the adjustable gide members. Primary and secondary quench sections include a plurality of the adjustable roller support means for supporting a portion of the endless belt. The primary quench section includes high flow, low suction air cooling devices. The secondary quench section includes air cooling devices. A plurality of the second elongated rollers are driven by the endless belt.

There is also provided drive means for the endless belt, including control means for causing the belt to alternately rotate the first and second elongated rollers in a first direction and then in an opposite direction, for an electronically adjustable extent of rotation, and for an adjustable speed of rotation, and to cause an extended unidirectional rotation of the first and second support rollers at an adjustable speed after a predetermined number of the alternate rotations, so that a sheet of glass placed upon the second elongated rollers in the load section will be conveyed into the heating chamber, adjustably oscillated at a plurality of predetermined locations within the furnace, conveyed to and oscillated within the quench sections, and conveyed to the unload section.

It is an object of the invention to provide novel heating and quenching means for a glass tempering apparatus having modular furnace sections, so that the processing speed of the system may be increased.

It is a further object of the invention to provide primary and secondary quench sections for a glass tempering apparatus having a roller-supported drive belt to reduce friction, where the roller supports are individually adjustable to assist in presenting a planar surface to the conveyor rollers, to increase belt life, and to reduce the driving power required.

It is a further object of the invention to provide electrical quartz heaters and a roller conveyor for a glass tempering apparatus capable of using a non-metallic endless drive belt to drive conveyor rollers without the chance of deformation of the heated glass by a splice of a spliced metallic belt or chain passing under a conveyor roller supporting a piece of heated glass.

It is a further object of the invention to provide conveyor rollers for use in furnace sections of the aforementioned glass tempering apparatus having replaceable non-metallic shaft ends, so that conveyor rollers can be retained in position by adjustable locators that can be adjusted to present new wear surfaces when required, thus eliminating roller floating and linear motion, and reducing replacement costs as well as frequency of damage due to accidental overheating which causes expansion of the pin and thus roll breakage due to the different expansion rates of the two materials.

It is a further object of the invention to provide primary and secondary heating sections and/or radiant energy electrical heating means for a glass tempering apparatus having conveyor roller and drive belt support systems, adjustable around a central axis to produce a horizontal and level conveyor surface.

It is a further object of the invention to provide primary and secondary heating sections and/or radiant energy electrical heating means for a heat treating apparatus having conveyor drive belts made of soft heat-resistant fabric to reduce wear on the ends of conveyor rollers, increase the efficiency of transmission forces, and reduce vibration transferred from the drive system to the glass being treated. The 1000 to 1 restriction stated in the aforementioned McMaster et al U.S. Pat. No. 3,806,312, column 6, line 63, does not apply to the present invention. Much smaller diameter drive sheaves and take-up sheaves may thus be used with the present invention while also attaining sufficient traction.

It is a further object of the invention to provide primary and secondary heating sections and/or radiant energy electrical heating means for use in a furnace section of a glass tempering apparatus having ends covered by a sleeve to protect the rollers, increase efficiency of power transmission, and further reduce vibration transferred from the drive system to the glass being treated.

It is a further object of the invention to provide primary and secondary heating sections and/or radiant energy electrical heating means for a reciprocating type furnaces for decreasing furnace length required, and for causing reciprocation of substantially less than the length of the glass being treated, thereby reducing size and cost of furnace sections, and reducing the time a conveyor roller is not transferring heat to glass being treated, so that individual rollers do not overheat and a greater percentage of the heated section is being used continuously. This latter feature also enhances the entire already-efficient system.

It is a further object of the invention to provide primary and secondary heating sections and/or radiant energy electrical heating means for a reciprocating mechanism to allow adjustment of the length of reciprocating motion so that the glass being treated may be made to contact substantially all of the conveyor rollers in a furnace section during reciprocation.

It is a further object of the invention to provide a workpiece heating and quenching apparatus having conveyor rollers in non-heated sections which resiliently support workpieces being treated, reducing thermal contact area between hot workpieces and cold conveyor rollers, as well as reducing breakage during loading and unloading.

BRIEF DESCRIPTION OF THE DRAWINGS

FIG. 8 is a side elevational view of a roller shoe according to a first embodiment of the invention.

FIG. 9 is a view of the roller shoe taken along line 9—9 of FIG. 8.

FIG. 10 is a side elevational view of a roller support assembly according to a first embodiment of the invention, for use in unheated sections of the glass tempering system.

FIG. 11 is a view of the roller support assembly taken along line 11—11 of FIG. 10.

FIG. 12 is a perspective view of an end plug for a roller according to a first embodiment of the invention.

FIG. 13 is an end elevational view of the end plug shown in FIG. 12.

FIG. 14 is a detail side elevational view showing a rubber washer installed on a roller according to a first embodiment of the invention.

FIG. 15 is an end elevational view, partly in section, of the installed rubber washer and roller of FIG. 14.

FIGS. 24a and 24b together show a top plan view of a novel and alternate form of quench jet assembly.

FIGS. 25a and 25b together show a front vertical elevational view of the quench jet assembly shown in FIGS. 24a and 24b.

FIG. 28 shows an end view of the FIG. 25a and FIG. 25b quench jet assembly.

FIG. 29 shows a schematic view of a quench section including high flow, low suction air cooling devices.

DETAILED DESCRIPTION OF SOME PREFERRED EMBODIMENTS

Figure 1:
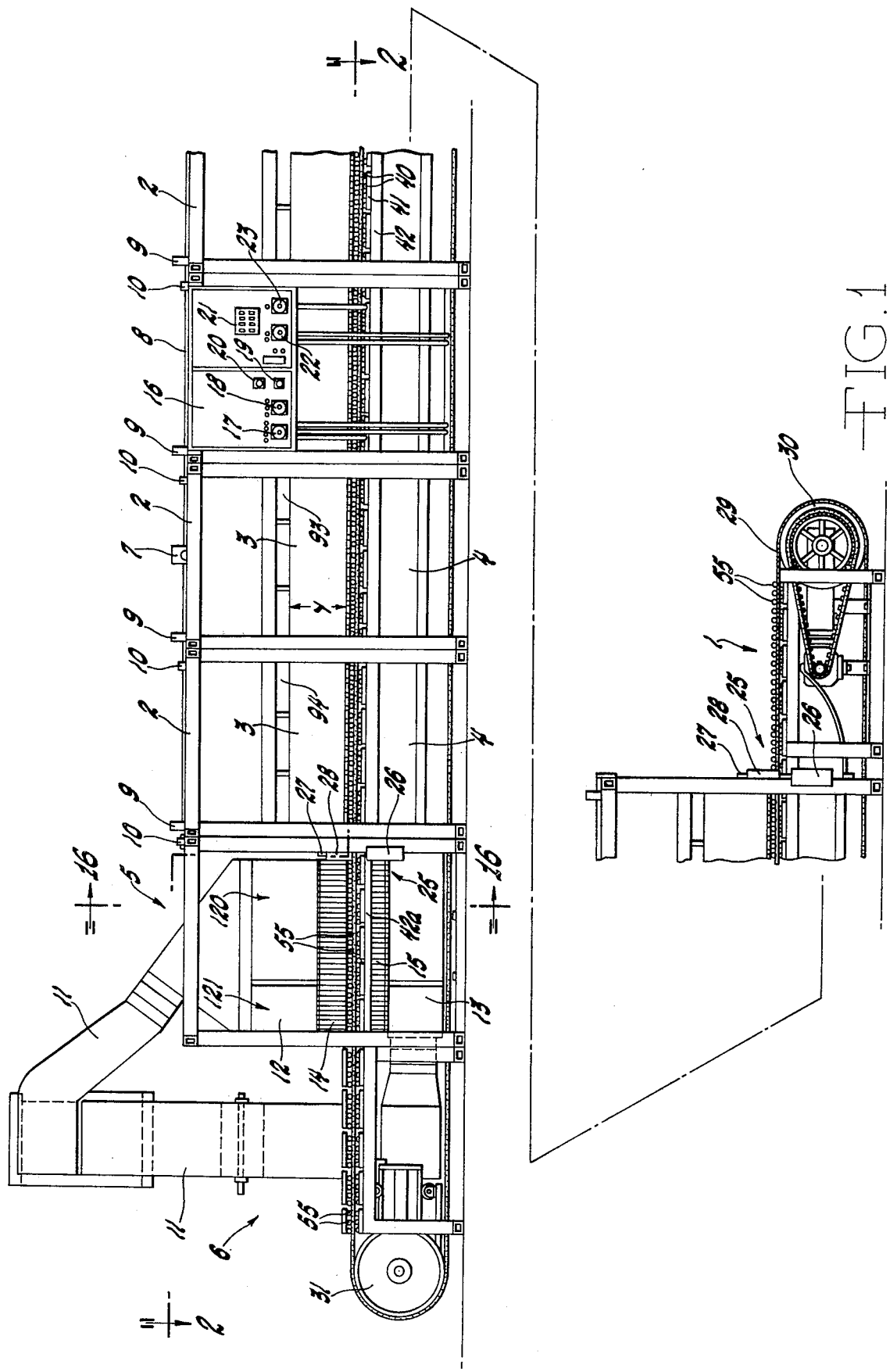
FIG. 1 is a side elevational view of a glass tempering system according to a first embodiment of the invention.

FIG. 1 illustrates a glass tempering system incorporating novel features according to a first embodiment of the invention. The system comprises a load section 1, modular furnace frames 2, upper and lower furnace sections 3 and 4, respectively, a section 5 (which includes primary and secondary quench sections), and an unload section 6.

Figure 18:
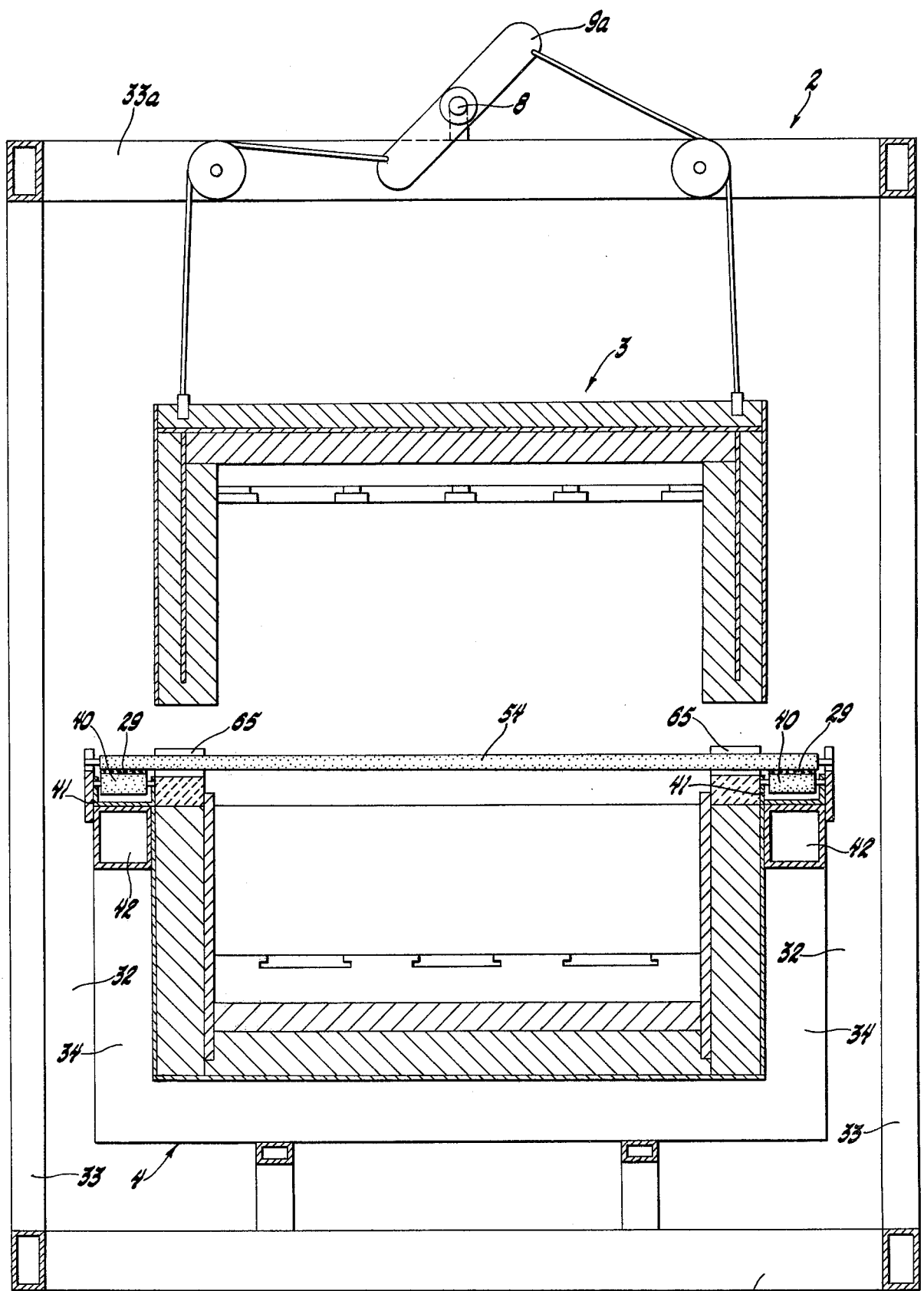
FIG. 18 is a sectional view of a first embodiment of a furnace section according to the invention, wherein the entire furnace upper section is raised for access to the heating chamber.

Actuator 7 rotates rod 8, supported by pillow blocks 10, to rotate arm 9a (FIG. 18) or chain wheel 9b (FIGS. 19, 20 and 23), and to lift upper furnace sections 3 to provide access to the interior of the furnace. In this regard, the main reason for lifting upper furnace sections 3 is to allow a workpiece, such as glass, which has been broken during heating due to an inherent defect, to be pushed out of the furnace. Another reason for gaining access to the interior of a conventional glass tempering furnace is to remove glass (which is electrically conductive when molten) from uncovered electrical heaters, or to remove it from steel plates protecting the electrical heaters. This problem is eliminated, or at least greatly alleviated, by the instant invention, as will appear below.

Actuator 7 may, for example, may be a conventional pneumatic cylinder actuated in a conventional manner, an electric motor coupled to a conventional rotary-to-linear motion converting device, such as a pulley and wire rope, or a gear and rack, or the like, for driving shaft 8 directly. Alternatively, actuator 7 may be a simple counterbalancing spring, depending on the requirements for an individual glass tempering system.

Air ducts 11 convey air from a blower (not shown) to upper and lower plenum chambers 12 and 13, from where the air is ejected through quench jet assemblies 14 and 15.

Control panel 16 includes a D.C. motor drive package (not shown) of conventional design, such as produced by Polyspede Electronics Corp. of Dallas, Tex., as Model Number PRD-8-300 Regenerative Drive System, various temperature controllers, timers, and an up-down presettable counter.

In the embodiment illustrated in FIG. 1, temperature controller 17 controls the temperature produced by infra red radiant electrical heaters 93 in a first upper furnace zone, not necessarily corresponding to a single furnace section 3. Temperature controller 18, in like manner, controls the temperature in a first lower furnace zone, while temperature controllers 22 and 23 provide control for infra red radiant electrical heaters 94 in upper and lower sections of a second furnace zone.

Timers 19 and 20, which is a reciprocation counter are used in conjunction with an up-down presettable counter 21 to determine the time a piece of glass will spend in an area of the furnace.

Counter 21, which may be of the type manufactured by Electronic Counters & Controls, Inc. of Mundelein, Ill., having two banks of thumbwheel switches, to select digitally the length of a feed or transfer cycle, and to select the desired length of an oscillating cycle. The active bank of counter 21 is selected by a timer 19 or reciprocation counter 20, and the counter 21 receives a representation of position from encoder 24, best shown in FIG. 2. The use of such devices to provide substantially infinitely-variable positioning and oscillating of pieces of glass is believed to be novel in itself, since it allows an empirical determination of the process parameters that will produce best results in a given task.

At both ends of the furnace sections of the illustrated machine, gates 25 are provided. The purpose of gates 25 is to shield the gaps through which the sheet glass passes in and out of the furnace from random drafts of cool air which can disturb internal temperatures and cause uncontrollable quenching, and breakage. Each gate 25 includes a pair of pneumatic cylinders 26, activated in synchronism with glass movement to push gate boards 27 upwardly in guides 28. The provision of such gates 25 is also believed to be novel. These gates 25 enhance greatly the possibility of open side apertures without loss of inner furnace heat. Air pressures originating at either end of the furnace and consequently being forced out of such apertures would cause extensive overheating of the drive belts and related components.

Figure 2:
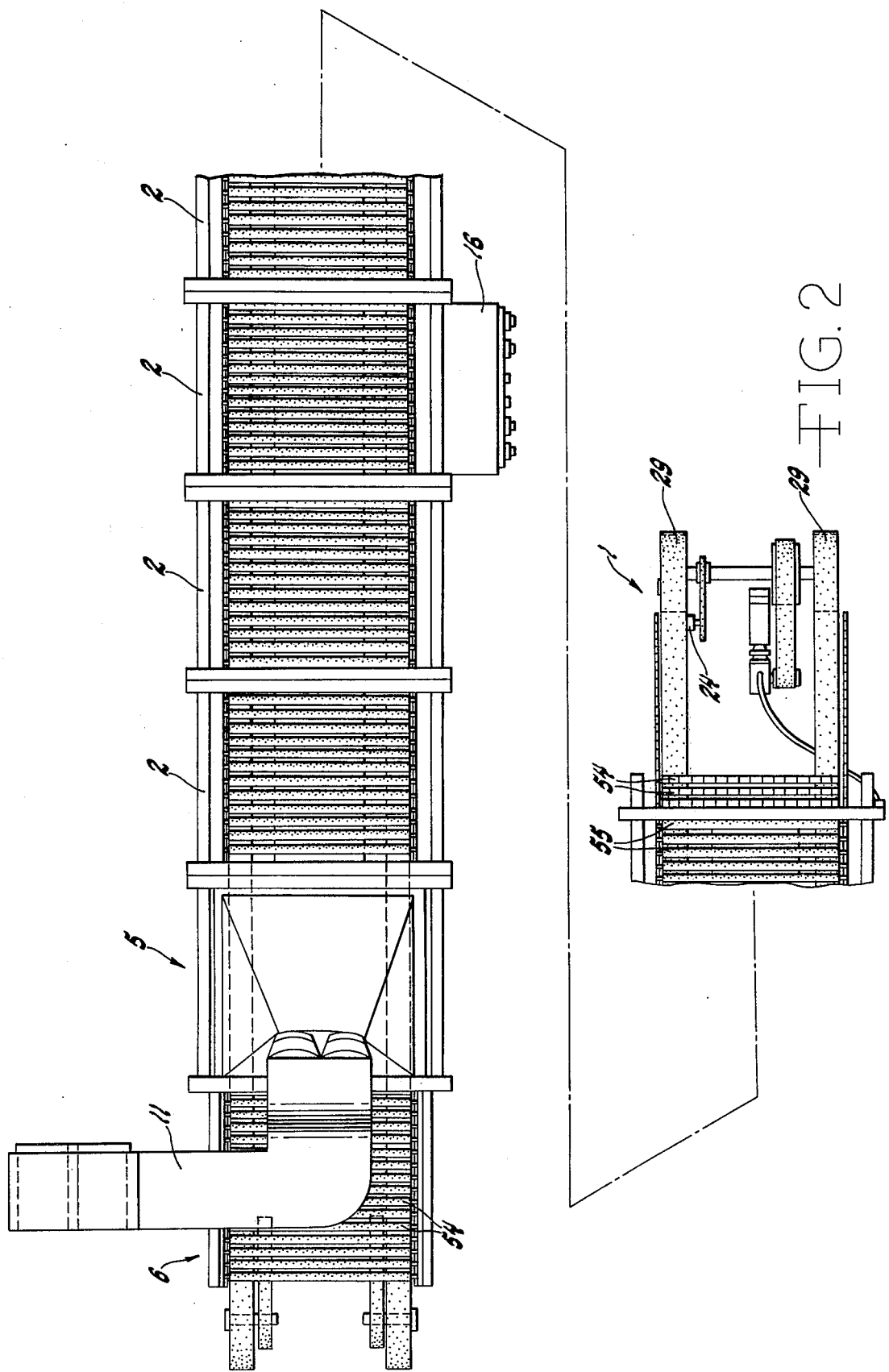
FIG. 2 is a top elevational view, partially in section, of the system taken along line 2—2 of FIG. 1.
Figure 3:
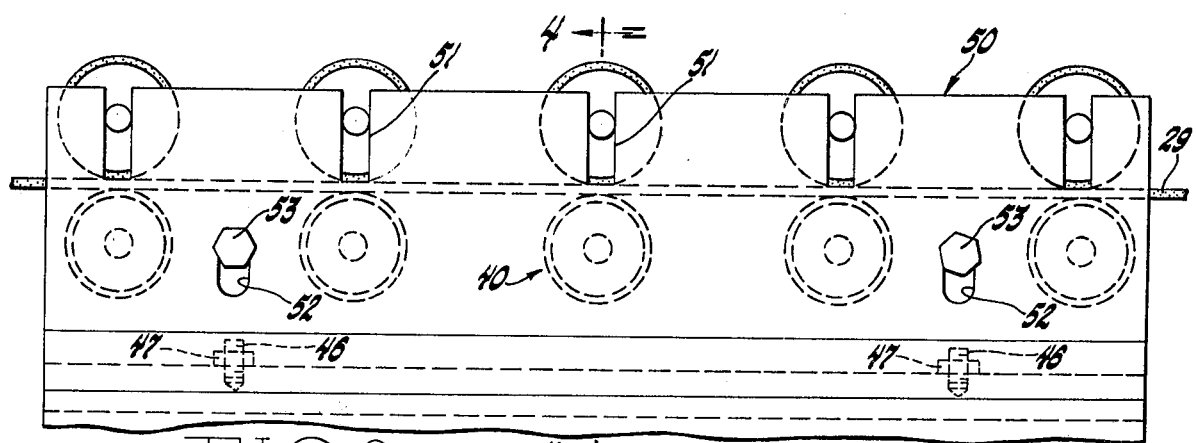
FIG. 3 is a side elevational view of a roller support assembly according to a first embodiment of the invention.

As shown in FIGS. 1 and 2, a pair of endless belts 29 extend the length of the machine, between drive wheels 30 and tension idler wheels 31. The novel construction of the machine, as better shown in FIGS. 16–20 and 23, creates a space 32 between top support frame section 33 and lower support frame section 34 through which an endless belt 29 may be installed over wheels 30 and 31.

In conventional machines, a metal belt is first placed on the machine, and then spliced while in place. Once the metal belt is installed, the welded splice cannot be completely smoothed, so that the belt, which indirectly supports glass being treated, will intermittently cause distortion in glass being treated. This renders one of thirty to forty pieces of glass being treated optically defective.

With the present invention, a belt 29 can be assembled off the machine, and a perfect splice can be produced.

Another cause of optical distortion in glass softened by heating in a tempering oven is vibration from the external environment and from the operation of the machine itself. In a preferred embodiment, the belts 29 are part of the solution to the problem. A spliceless, woven polyester loop is coated with silicone rubber and installed as the belt 29. The resilience and damping of the cloth and rubber serve as vibration insulators. A suitable belt material is available from Globe Albany Corp. of Buffalo, N.Y., as style IWP-3 Untreated Silicone COS.

Belts of conventional machines are slidably supported on flat surfaces. This is also a source of possible vibration from stick-slip friction, as well as presenting difficult alignment problems in providing a truly flat surface. These problems are also greatly alleviated by the present invention. Belts 29 are supported on antifriction rollers 40 (FIGS. 1, 3–11, 18–23), mounted in adjustable roller supports 41 extending over the length of the machine, adjustably secured to frame members 42 and 42a. Belts 29 act only as a driving means, and should not be confused with a support system, such as disclosed by the aforementioned McMaster et al U.S. Pat. No. 3,806,312, column 1, line 62-column 2, line 15. Frame members 42a (FIGS. 1, 16) are narrow to reduce air restriction.

Figure 5:
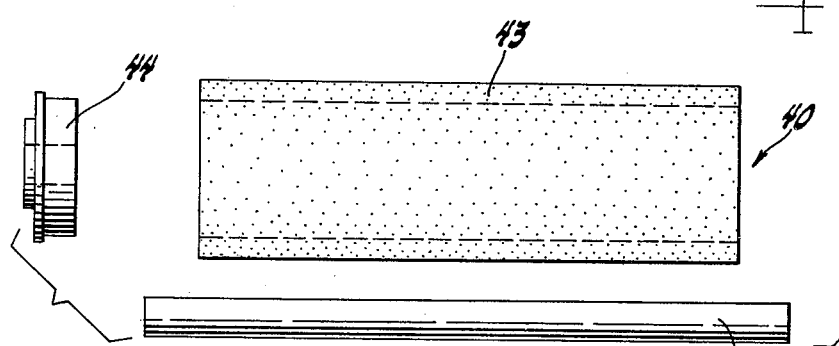
FIG. 5 is a disassembled view of a belt support roller according to a first embodiment of the invention.
Figure 6:
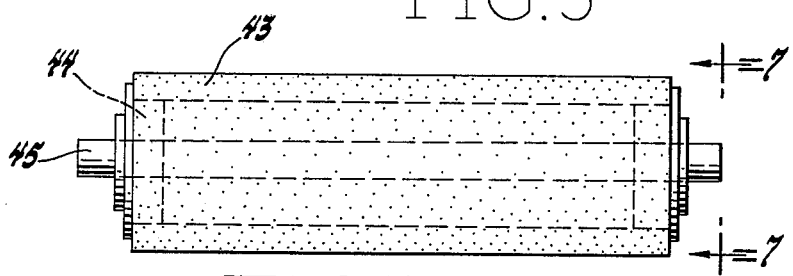
FIG. 6 is an assembled view of the FIG. 5 belt support roller.
Figure 7:
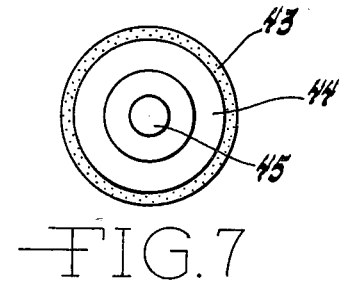
FIG. 7 is a view of a belt support roller taken along line 7—7 of FIG. 6.

As shown in FIGS. 5, 6, and 7, each support roller 40 is made from a tube 43, two bearing caps 44 and rod 45. Roller supports 41 are adjustable by means of set screws 46, which bear against member 42. After the desired orientation of support 41 is attained by adjusting set screws 46, the set screws 46 are secured by lock nuts 47. The supports 41 are secured by bolts 48 into member 42.

After supports 41 are suitably adjusted to provide a truly flat supporting surface, belt 29 is installed, and is supported on rollers 40.

Conveyor rollers 54 and 55 to support the glass to be treated are then placed upon the belts 29, and restrained from lateral motion by adjustable roller guides 50, as shown in FIGS. 3, 4, 10 and 11. As shown, guides 50 have slots 51 to hold the rollers, and slots 52 cooperating with bolts 53 to allow adjustment of guides 50. As slots 51 wear, the guides 50 may then be adjusted to present non-worn surfaces to the rollers.

There are at least two basic types of conveyor rollers according to the present invention. There are high-temperature ceramic rollers 54 and low temperature rollers 55. Although rollers 54 could be used throughout the machine, in the preferred embodiments rollers 54 are used only between furnace sections 3 and 4, and rollers 55 are used in load section 1, quench section 5 and unload section 6.

Figure 4:
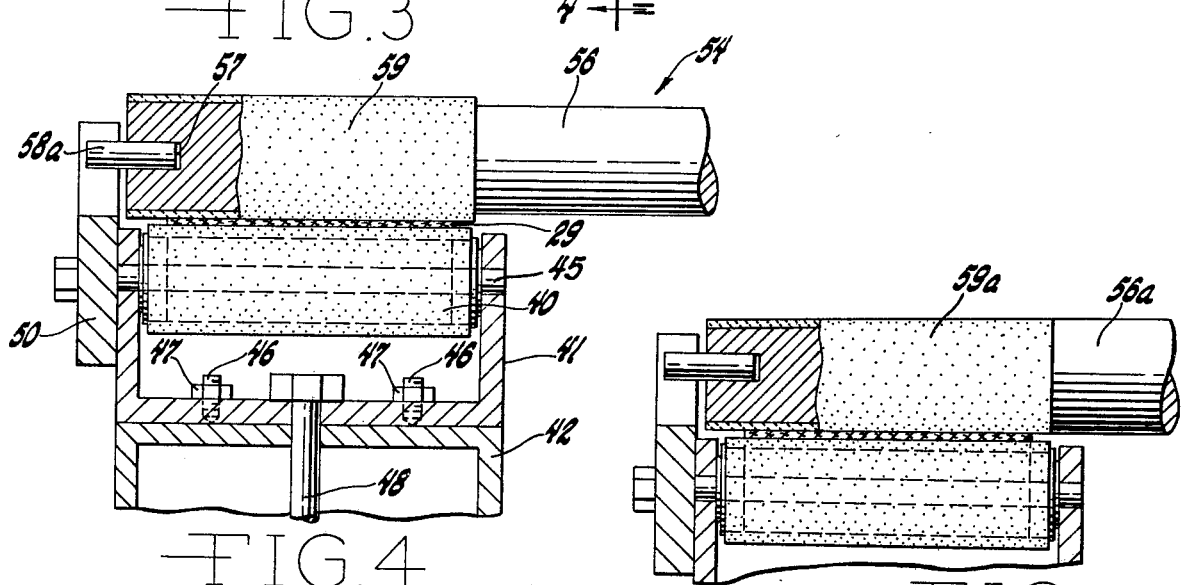
FIG. 4 is a sectional view of a roller support assembly taken along line 4—4 in FIG. 3.
Figure 4A:
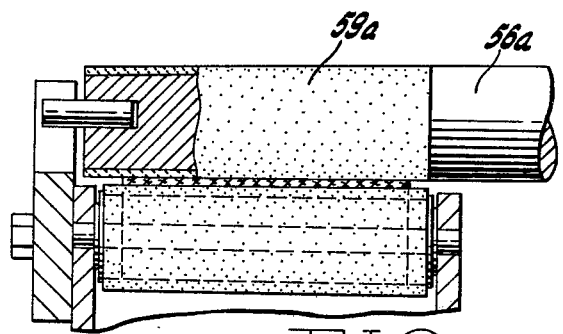
FIG. 4a is another sectional view of a roller assembly similar to that shown in FIG. 4 and showing similar details thereof.

As is shown in the art, roller 54 is composed of a ceramic or fused silica shaft 56, having a recess 57 at either end to frictionally retain pins 58a. In a preferred embodiment, pins 58a are made of a rigid non-metallic material, such as Teflon or G-10 Epoxy. This provides several advantages. Pins 58a can be easily replaced when worn, and do not tend to break the shafts 56 should overheating and differential expansion occur. The provision of the renewable pin 582, in conjunction with guide 50, is believed to be novel, and substantially eliminates roller float, or lateral movement, and cocking, which are additional sources of vibration which can distort or scuff softened glass. In the embodiment shown in FIG. 4 ceramic shaft 56 carries a resilient sleeve 59 at each of its ends. Sleeve 59 extends the width of belt 29. Sleeve 59 further reduces vibration. In the embodiment shown in FIG. 4a, ceramic shaft 56a is turned down at either end so that the resilient sleeve 59a may be provided flush with the exterior of shaft 56a. As shown, sleeve 59a does not interfere with removal of broken glass by simply pushing it across rollers 55 and out the opposite side of the machine.

The construction of low-temperature rollers 55 is shown in FIGS. 11–15. Tubular members 60 are provided at both ends thereof with ends caps 61 which have pins 58b retainable in slots 51 of guides 50. Each member 60 is provided with a plurality of square-bottom grooves 63, which retain cylindrical rubber washers 62. Grooves 63, and washers 62 are closely spaced at both ends of member 60, and are spaced apart over the remainder of members 60 in two different patterns so that washers 62 may be staggered on intermediate portions of adjacent rollers 55.

FIGS. 8 and 9 illustrate roller shoes 65 according to the present invention. As will be apparent from FIGS. 18–20 and 23, roller shoes 65 rest upon an upper surface of lower furnace sections 4, and partially support a lower surface of upper furnace sections 3, and also serve as insulation to reduce heat losses where rollers 54 enter the heating chamber of the furnace.

Figure 16:
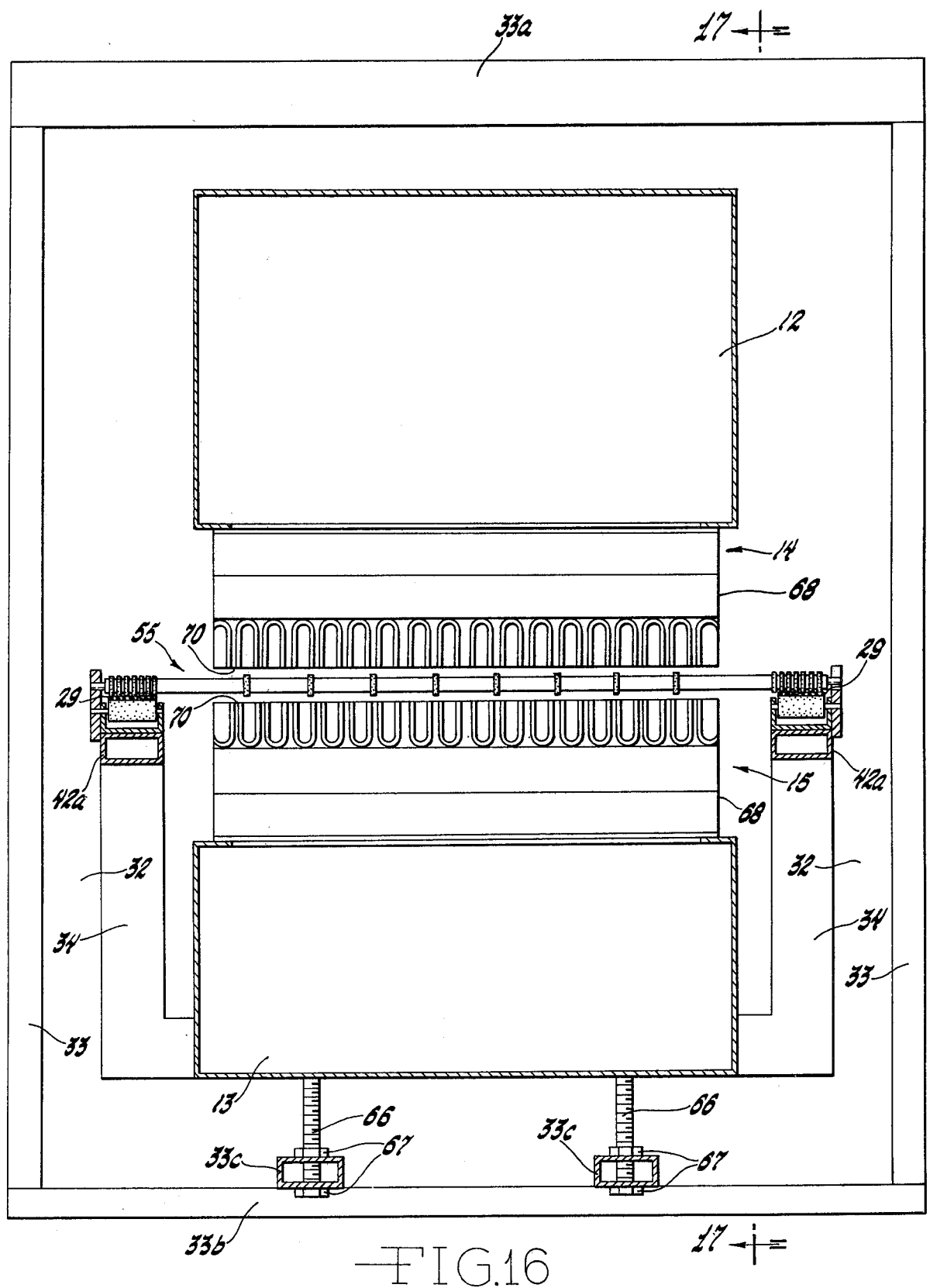
FIG. 16 is a sectional view of the quenching unit according to a first embodiment of the invention taken along line 16—16 of FIG. 1.
Figure 17:
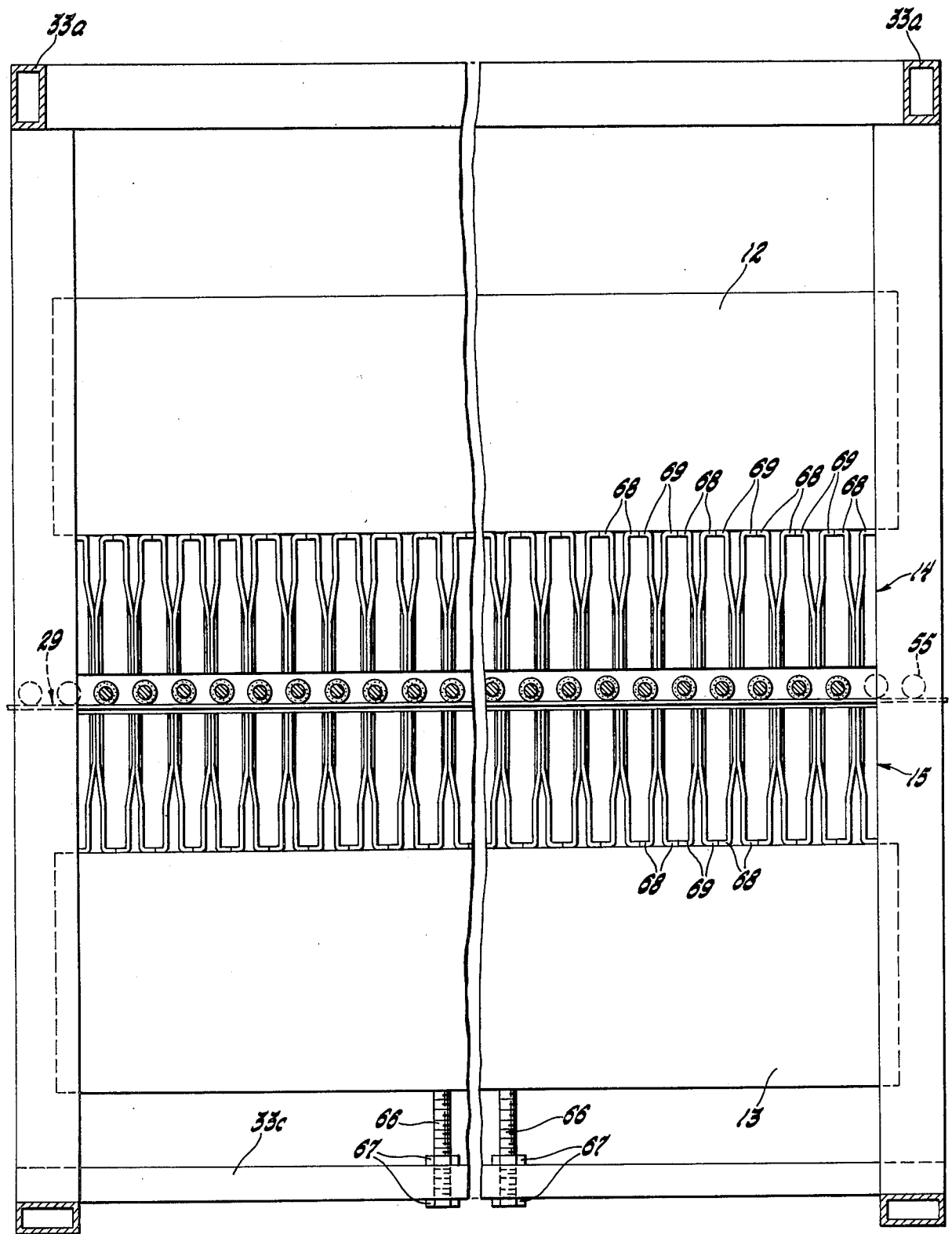
FIG. 17 is a sectional elevational view of the quenching unit taken along line 17—17 of FIG. 16.

FIGS. 16 and 17 illustrate a quenching unit according to the present invention. Side upper frame members 33 and top and bottom members 33a and 33b support upper and lower plenums chambers 12 and 13. In the section illustrated, plenum chamber 13 is adjustably supported by threaded bolts 66, retained in position by nuts 67 on both sides of rails 33c attached to frame member 33b. Although not shown in the view illustrated, the upper plenum chamber 12 is supported from member 33a in a similar manner. This allows easy adjustment of the distances from quench jet assemblies 14 and 15 to a sheet of glass supported on rollers 55, to allow for varying the force and spreading of cool air to achieve optimum quenching rates. Quench jet assemblies 14 and 15 may, for example, be made by welding complementary stampings 68 and 69 together, and filling in the open ends with matching plates welded in place, as in Flynn U.S. Pat. No. 3,499,720. As is known, the upper and lower quench jets should, preferably, approximately oppose each other, to provide balanced vertical forces.

The jets in adjacent rows should, preferably, be staggered to provide even distribution of cool air. In the illustrated embodiment of the invention, this function is therefore easily and inexpensively accomplished, with only two different parts repetitively assembled to form a plurality of jets 70 from each pair of stampings 68 or 69.

Figure 21:
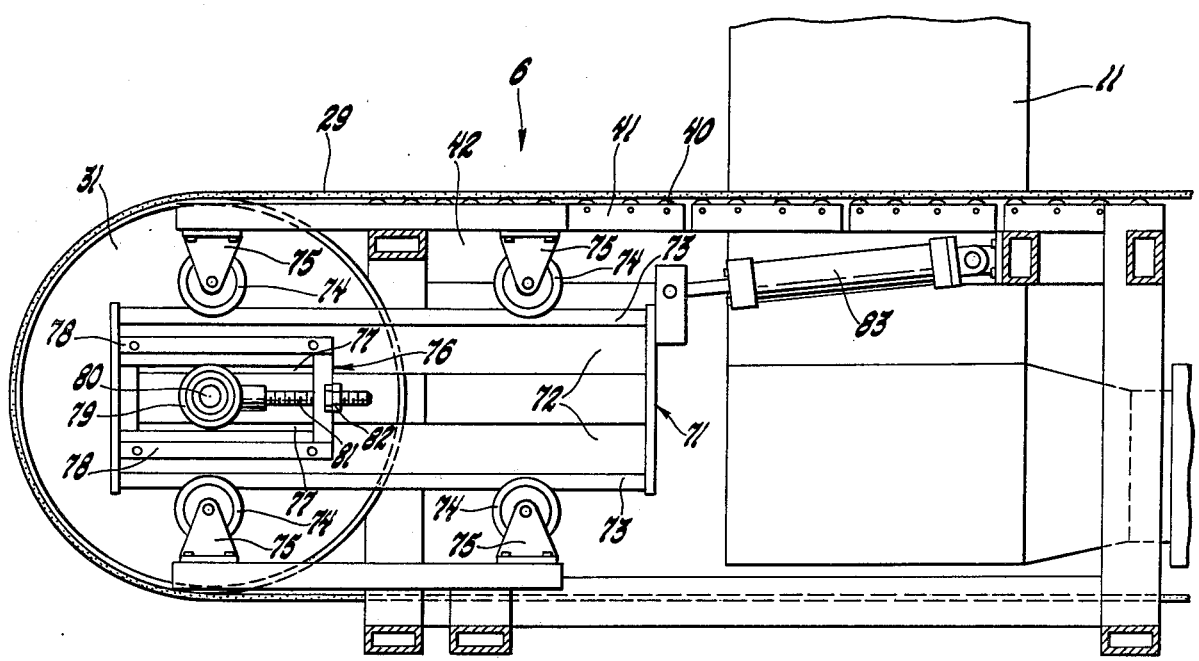
FIG. 21 is a side elevational view, partially in section, of an unloading section of a system according to a first embodiment of the invention.
Figure 22:
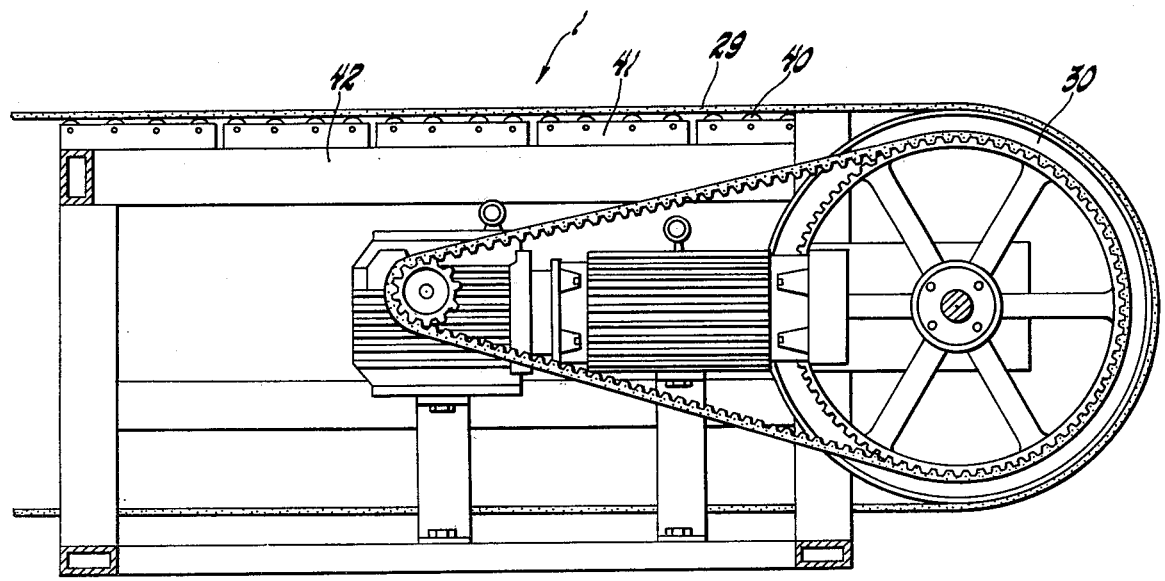
FIG. 22 is a side elevational view, partially in section, of a loading section of a system according to a first embodiment of the invention.

FIGS. 21 and 22 illustrate details of the load and unload sections of the illustrated embodiments of the invention. In FIG. 21, the belt tensioning assembly at unload section 6 is shown. On both sides of the illustrated machine, a frame 71 includes a pair of members 72 having V-shaped edges 73 that mate with V-shaped grooves in rollers 74, which are mounted in brackets 75. Brackets 75 are, in turn, fixedly mounted to appropriate parts of the frame of the illustrated embodiment.

Frame 71 carries an adjusting frame 76 having V-shaped edges 77 on members 78. Guide roller 79, having mating V-shaped grooves, is rotatably mounted to a shaft 80 of wheel 31, and secured by threaded rod 81. Threaded rod 81, together with nuts 82, positions shaft 80 within frame 71 and guide frame 76, and form a convenient mechanism for compensating for stretching of the belt 29. The tension of a belt 29 may be maintained by pneumatic cylinder 83 pressing upon frame 71, as shown, or by other suitable means.

Figure 19:
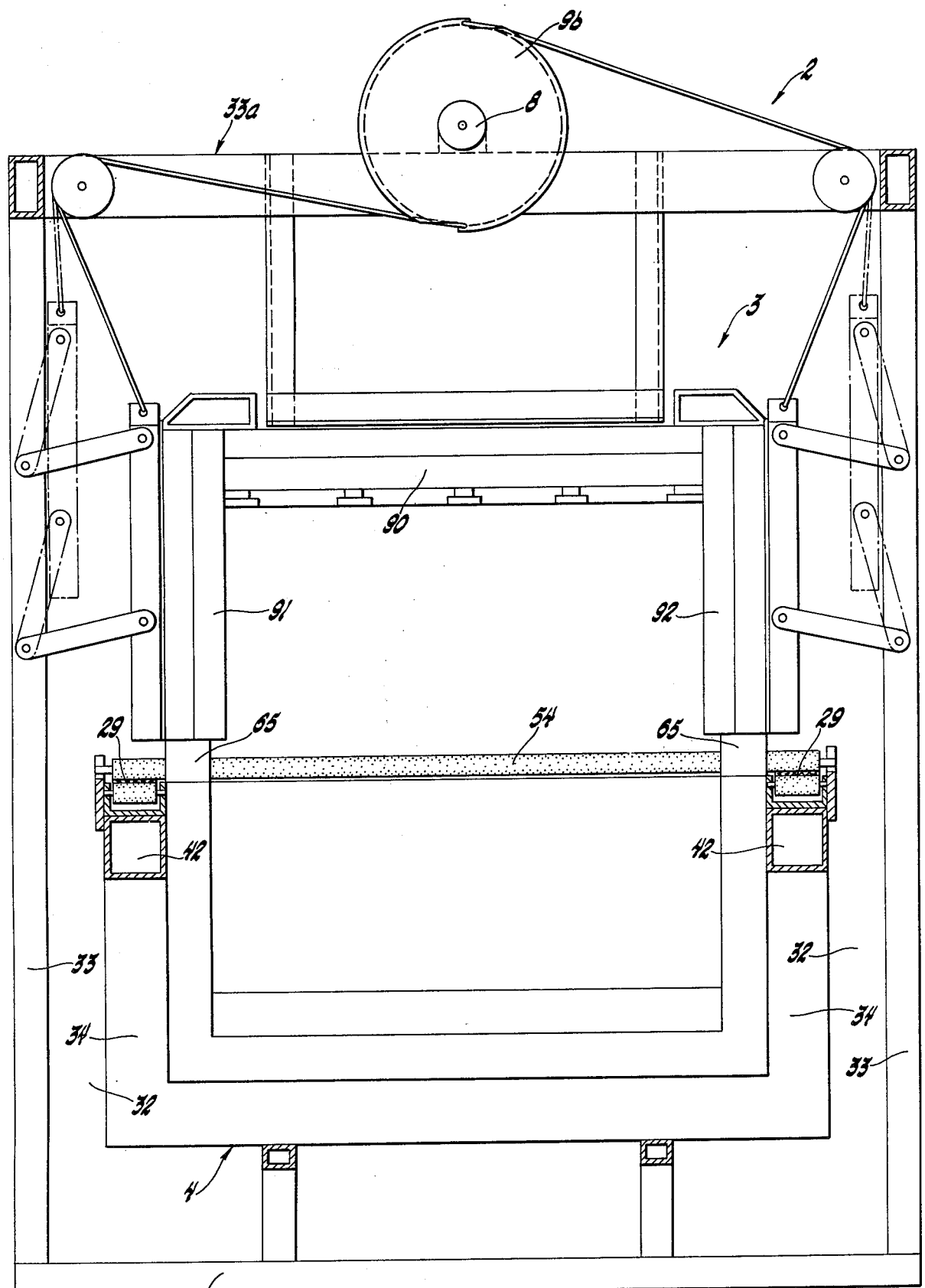
FIG. 19 is a sectional view of a second embodiment of a furnace section according to the invention, wherein the top portion of a furnace upper section is fixed in position, and side wall portions are movable to gain access to the heating chamber.

FIG. 19 shows a second embodiment of the furnace secton wherein the top portion 90 of a furnace upper section 3 is fixed or stationary in position, and wherein the side wall portions 91 and 92 are movable to gain access to the heating chamber.

Figure 20:
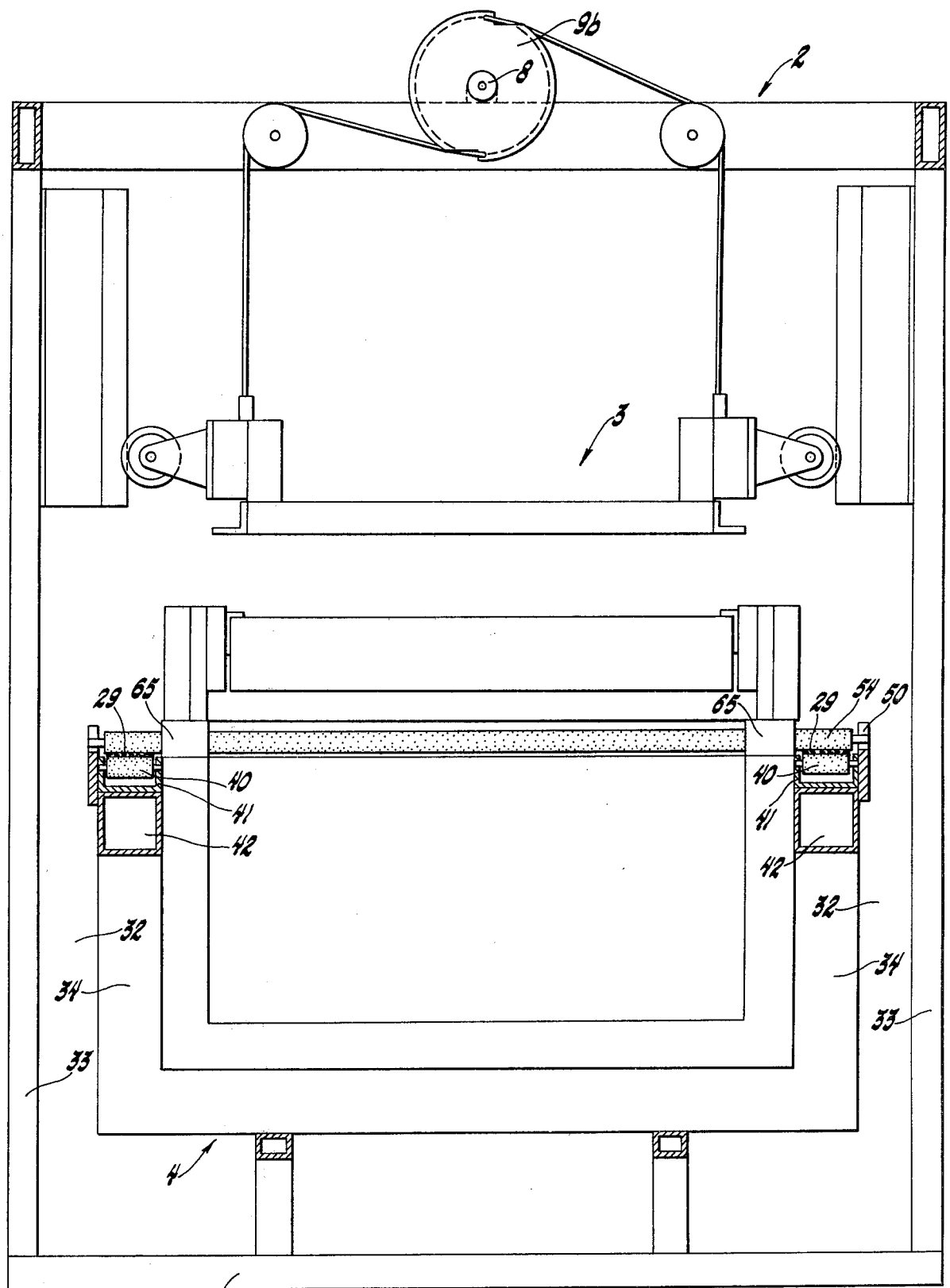
FIG. 20 is a sectional view of a third embodiment of a furnace section according to the invention, showing guide means for a movable furnace upper section.

FIG. 20 illustrates a second embodiment of a furnace section, with particular emphasis on guide means for moving en masse the entire furnace upper section 3 by the use of a chain wheel 9b.

Figure 23:
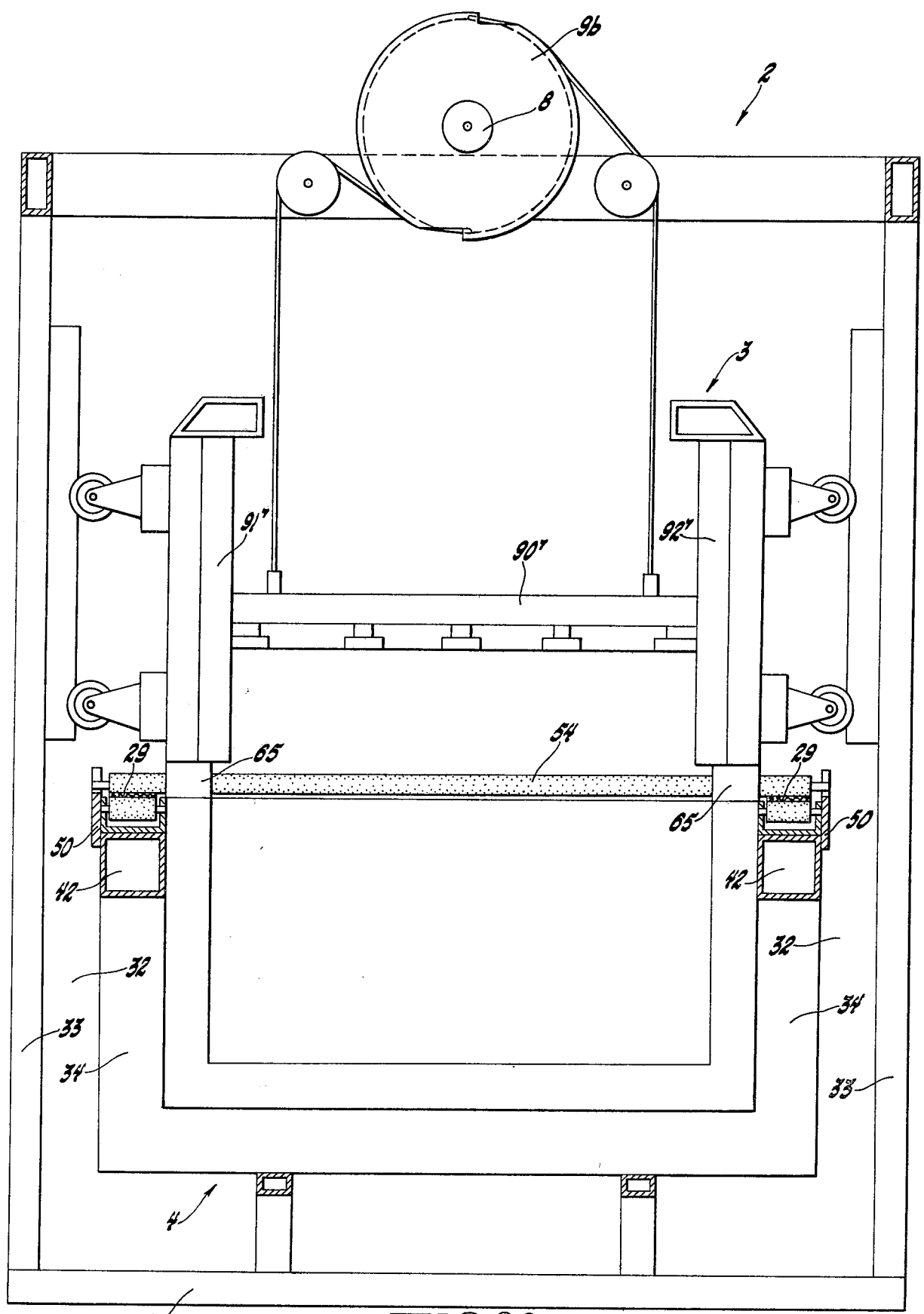
FIG. 23 is a sectional view of a fourth embodiment of a furnace upper section according to the invention, wherein the upper portion and the sidewall portions are independently movable to allow variable spacing between the heating means and the glass being treated.
Figure 24A:
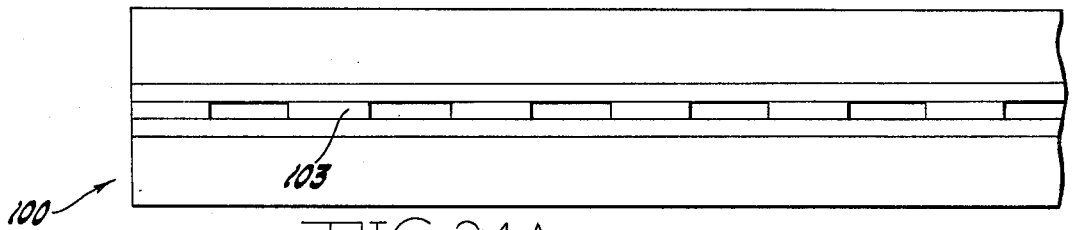

FIG. 23 illustrates a fourth embodiment of the furnace upper section 3, wherein the top portion 90' and the side wall portions 91' and 92' are independently movable to allow variable spacing between the heating means and the glass being treated.

One aspect of the present invention resides in the roller track supporting the conveyor drive belts. This feature substantially lessens the friction that is otherwise encountered with slider type belt systems, and thus increases belt life and reduces the power necessary to move the same. In the present invention it should be noted that the rollers are beneath the conveyor drive belts.

Another aspect of the invention relates to the locators required for conveyor roller spacing which are adjustable to provide a new wear surface when necessary. This eliminates roller float or linear motion.

Another aspect of the invention resides in the fact that the heating zone sizes more closely approximate the piece of the glass being treated. This is an important difference with respect to the prior suggestions such as in McMaster U.S. Pat. No. 3,994,711 due to the fact that in the present invention the glass is reciprocated five inches or less in either direction during heating and cooling. In other systems, such as in McMaster U.S. Pat. No. 3,994,711 the glass being treated moves at least the length of the part being treated.

Another aspect of the invention resides in the provisions for adjusting the length traveled during the reciprocating period to correspond with the length of the glass product. This reduces overheating of the product ends by limiting contact with the hot conveyor rollers. With the present invention, it is possible to change the distance the glass product moves back and forth in the oven. The prior suggested systems cannot accomplish this.

The invention also provides fully adjustable roller and drive belt support systems, around a central axis, for controlling the horizontal plane of the track and thus maintaining a more level conveyor bed. The bed level is critical to production of a quality product.

The invention also provides a furnace construction which permits the use of endless conveyor belts that eliminate the need for on-site splices or segmented systems. Splices and/or segmentation causes the bed roll to be raised whenever it passes over any roll area. This raising or lifting is transferred to the product if it happens to be at the splice in question, and the glass is in the pliable stage of the product being treated. This would result in an inferior or warped end product.

The invention also provides unitized zone construction, allowing for future increase in product output, simply by installation of one or more heating zones and lengthening of drive belts. Few other alterations are necessary to expand the system.

Another aspect of the invention resides in the use of a wear-resistant, disposable, G-10 Epoxy axle, in liew of a normally steel, non-removable axle used by conventional systems. This reduces the cost of replacement of ceramic rolls due to pin wear.

Another aspect of the invention is the incorporation of a soft, heat-resistant fabric, which could be coated with Teflon and/or silicone rubber. This reduces wear on journal ends of the ceramic rollers. This also increases driving forces transmitted to the conveyor rolls; eliminates the need for large diameter sheaves (such as the 1000 to 1 conventional sheave diameter to belt thickness ratio such as McMaster U.S. Pat. No. 3,994,711 suggests); does not require additional heat to keep belt tracking straight; does not require the use of an abrasive device to grind down dimples in a belt surface; and does not require lubrication.

With reference to FIGS. 24a, 24b, 25a, 25b, 26, 27 and 28, there is shown a novel form of port or quench jet assembly 100, which may be used in lieu of quench jet assemblies 14 and 15. These Figures also illustrate the novel method of fabricating the assemblies 100.

Figure 25A:
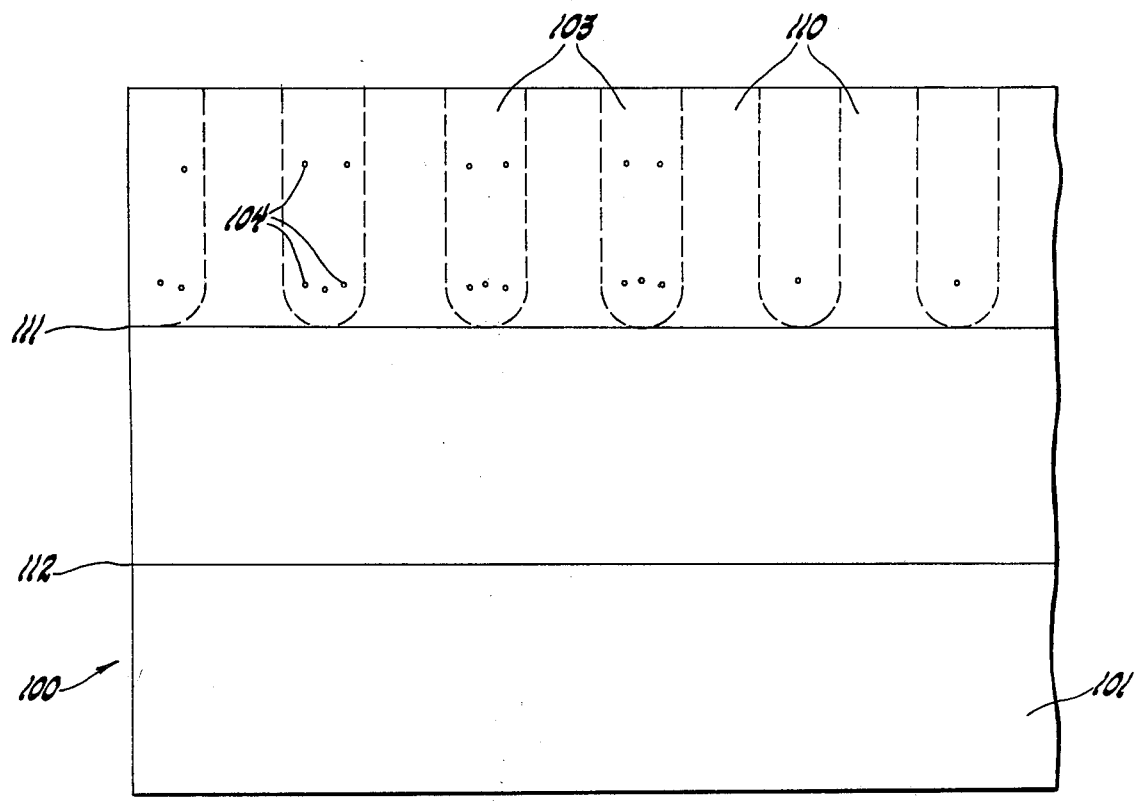
Figure 26:
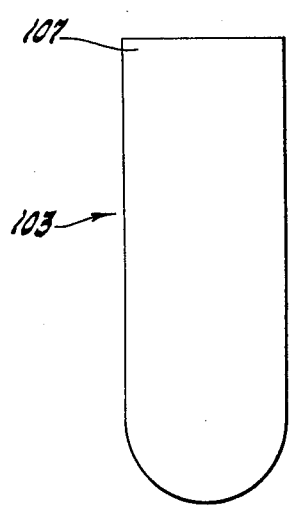
FIG. 26 shows a elevational vertical view of a spacer element which forms part of the quench jet assembly shown in FIGS. 24a, 24b, 25a and 25b.
Figure 27:
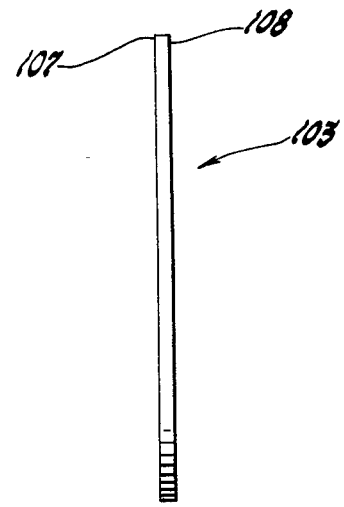
FIG. 27 shows a side elevational view of the spacer element shown in FIG. 26.

Each assembly 100 may be fabricated from two opposite side members 101 and 102 between which there are equally spaced and spot welded a series of spacer elements 103. In FIGS. 25a and 25b, there is also shown a typical pattern of spot welds 104 for welding the main body of the spacer elements 103 to the opposite side members 101 and 102.

The method of fabricating this assembly 100 proceeds as follows. First, the ends 105 and 106 of members 101 and 102, respectively, are closed against the intervening spacer elements 103. Then, the next step would be to weld across the spacers and the outside members so that the portions 107 and 108 of each spacer element 103 is welded to ends 105 and 106 of the side members 101 and 102. The next step would be to spot weld the spacers to the members 101 and 102 at four spot weld 104 points for each spacer element 103. This produces a series of tubes 110.

In an actual working embodiment of the quench jet assemblies 100, the spacer elements 103 were fabricated from 10 gauge sheet metal, wherein each element 103 had an overall length of three inches with its curved portion having a ½ inch radius. The side members 101 and 102 were formed from 14 gauge sheet metal and had an overall height of 9 inches composed of three 3-inch sections separated by the bending points 111 and 112. Each side member 101 and 102 was provided with a one inch flange 113 and 114, respectively, oriented substantially perpendicular to the main body of the members 101 and 102, respectively. The dimension x was approximately 0.283 inches, and the spot welds were patterned approximately two inches apart, with the center line of adjacent tubes 110 being set on two inch centers. Each spacer element 103 was approximately one inch in width. This resulted in a quench jet assembly 100 having a height of approximately nine inches and a greatest width of approximately two and one-half inches at the flanged portions.

Before setting forth an explanation of FIGS. 29–32, attention is directed to the last four paragraphs of the "Background of the Invention" section set forth hereinabove.

Due to the ever-increasing need for thinner and thinner materials, such as glass, to effect weight savings and cost savings in raw material, even greater cooling fluid pressures have become necessary when tempering. However, operating at these new pressure levels results in even greater noise levels, which are virtually unbearable to employees and violate OSHA standards. The present invention substantially eliminates the noise problem, and opens the way for further developments in the thin material, such as thin glass, areas because of the greater cooling ability, amongst other reasons. For example, it is well known in the glass industry, that it is necessary to reduce the temperature of the glass from approximately 1100° F. to approximately 700° F. in a very short period of time, e.g., between two and six seconds. After this time, it is still necessary to cool the glass; however, this may be done at much lower pressures and lower quantities of coolant, and hence at a lower noise level. This so-called secondary cooling is usually necessary only until handling temperatures are reached, which are usually 200° F. or so.

Bearing in mind the preceding explanation, the following alternate embodiment of the present invention will now be described with reference to FIGS. 1, and 29–32.

Figure 30:
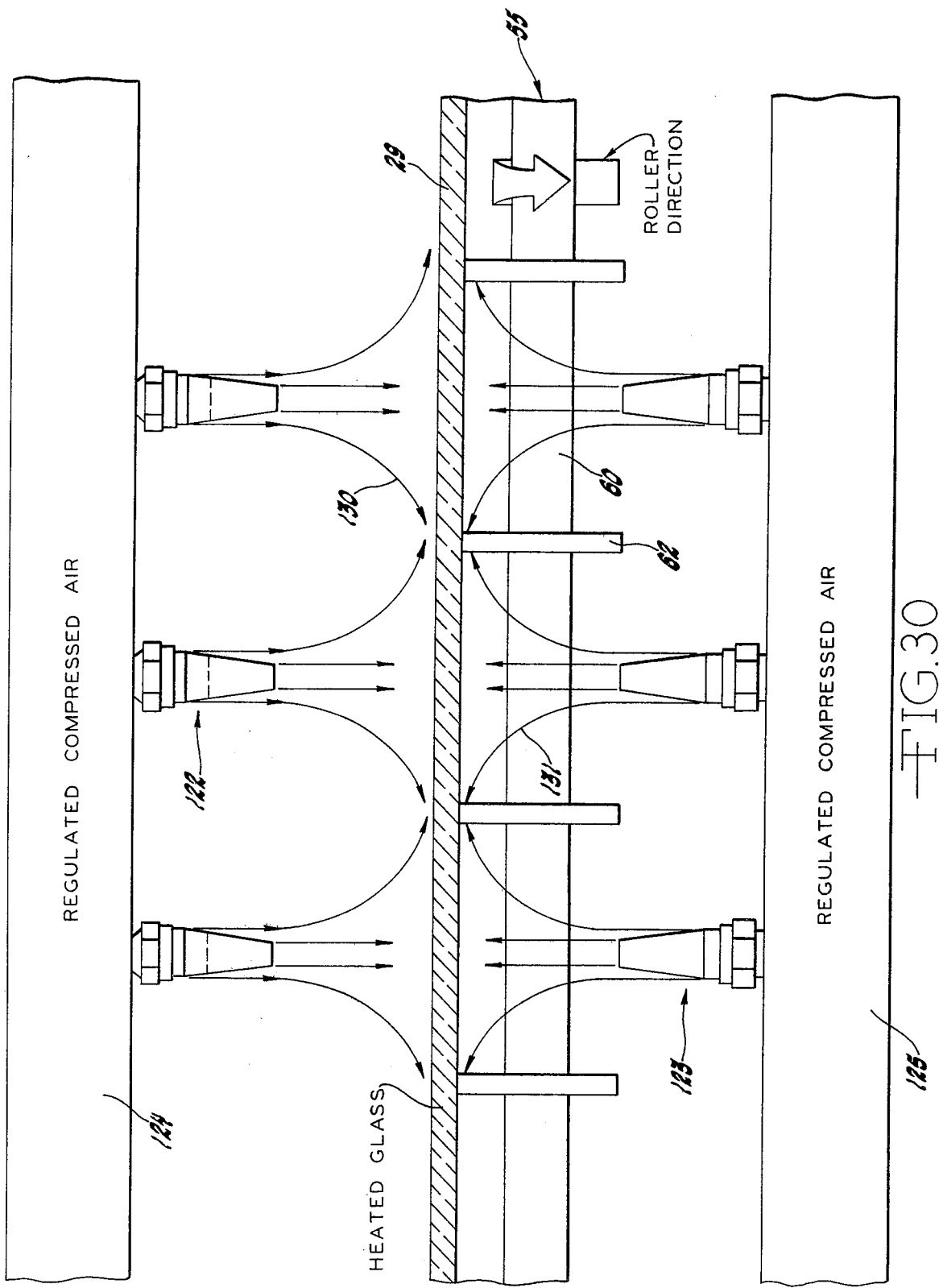
FIG. 30 illustrates a front view of the FIG. 29 arrangement.

As shown in FIG. 1, the cooling section 5 may be partitioned into a primary quench section 120 and a secondary quench section 121. In order to achieve a high velocity flow of coolant air while at the same time reducing or completely eliminating any noise problem, the primary quench section 120 may, for example, utilize the high flow, low suction air cooling devices or nozzles 122 and 123 (as shown in FIGS. 29 and 30) in lieu of the quench jet assemblies 14, 15 or 100. For example, a series of nozzles 122 may be disposed from an upper input supply chamber of regulated compressed air 124, and a similar series of nozzles 123 may project from a lower regulated compressed air chamber 125.

The nozzles 122 and 123 use a small flow of compressed air to induce and entrain large flows of air from their surroundings. The compressed air is throttled through an extremely thin aperture or slot, and thus attains sonic velocity. The sonic velocity air particles collide with nearby still air, and causes the same to accelerate and create a highly amplified mass flow. In effect, the nozzles 122 and 123 utilize an impulse principle so that small high speed particles of air collide with still particles causing them to move in turn. The extremely fast moving primary air is capable of causing motion in a much larger mass of secondary air. The impulse principle utilized can be compared with a break in a billiards game. The nozzles 122 and 123 draw in air from their surroundings, and amplify the compressed air input flow ten or more times, thus making drastic reductions in the amount of compressed air needed for cooling. Furthermore, there results in an inherently quiet operation which allows use of such nozzles in noise reduction programs. Not only is the noise level drastically reduced, but the compressed air consumption is cut to a fraction of open jet use.

The nomenclature "high flow, low suction air cooling devices" as used herein is intended to differentiate the nozzles 122 and 123 from a venturi or an ejector or a Coanda airmover. The nozzles 122 and 123 utilize an impulse air flow amplifier design which produces large flows of air, such as those designated as 126 and 127 in FIG. 29, from a small primary flow of compressed air. The nozzles 122 and 123 may have basic amplification ratios of, for example, 10:1 to 25:1, which are larger than the ratios produced by venturis, ejectors or Coanda airmovers. Furthermore, the nozzles 122 and 123 are extremely quiet, and will produce small suctions. The following explanation of the nozzles 122 and 123 is set forth.

Air from industrial compressed air lines or chambers 124 or 125 enter a small inlet in the nozzle 122 or 123, and flows into plenum chamber surrounding a ring-shaped slot. This ring slot may, for example, be only 0.002 inches wide and represents a restriction to the compressed air. The air is throttled to atmospheric pressure as it passes through the slot and it attains sonic velocity. This thin sheet of high velocity air (the primary air) leaving the nozzle is deflected toward the outlet by a small lip of the inlet ring, and it moves along the interior surface of the nozzle 122, 123 through its throat.

Many of the small particles of fast moving primary air bump into still particles in the inlet region. This causes the still particles to speed up, and the fast particles to slow down. Thus, the primary stream is sacrificing velocity to induce large amounts of air into the stream from the surroundings. A small suction is created in the nozzle outlet region, and an amplified flow moves along the throat.

If the outlet 128 or 129 of the nozzle 122 or 123, respectively, is not connected to a duct, its outlet stream will discharge into the still air surrounding the outlet, and, by a similar process of bumping, the entire outlet flow will entrain additional air from the surroundings, and the amount of air flowing a few feet away from the outlet will be many times as great as the outlet flow rate or more. In such unducted applications, this entrainment ratio multiplies times the basic amplification ratio, and flows up to sixty times the compressed air consumption are easily possible. Thus, induction and entrainment take place outside the nozzle 122 or 123.

With reference to FIGS. 29 and 30, components 124 and 125 may take the form of high pressure plenums to which high pressure air is supplied through an electrically-driven blower. Attention is also directed to FIG. 30 to the air patterns 130 and 131 which give full coverage of the workpiece, which in this instance is glass.

Figure 31:
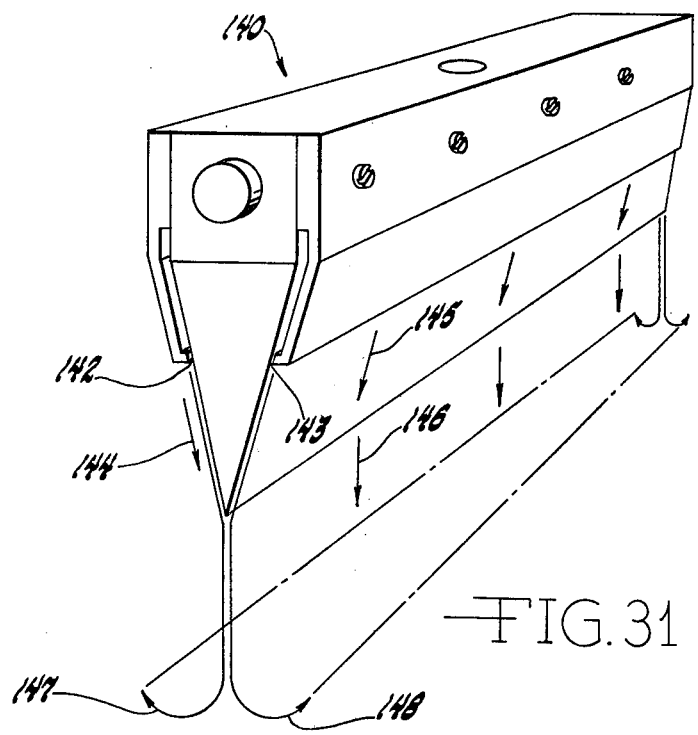
FIG. 31 shows a perspective view of a first form of curtain high flow, low suction air cooling device.
Figure 32:
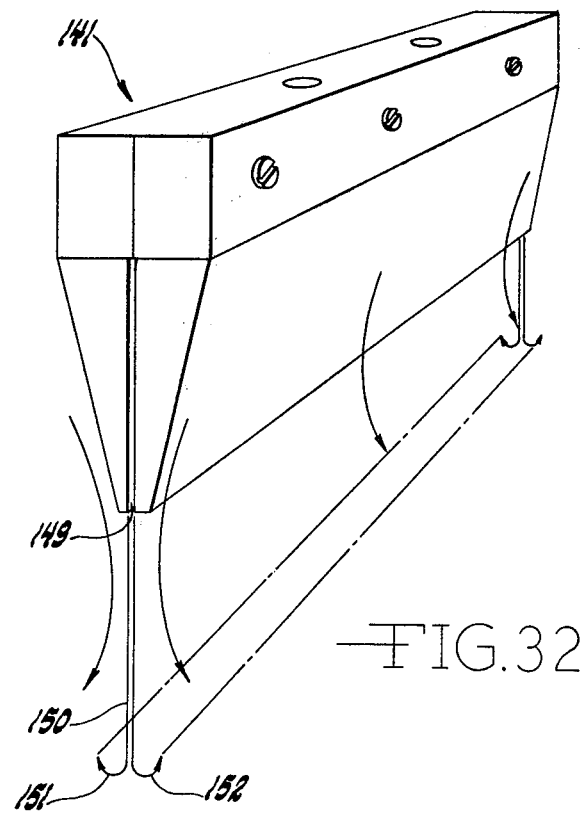
FIG. 32 shows a perspective view of an alternate form of curtain high flow, low suction air cooling device.

FIGS. 31 and 32 show two different devices 140 and 141, respectively, which are further embodiments of the high flow, low suction air cooling devices described hereinabove. The devices 140 and 141 may be termed curtain air cooling devices which employ exactly the same principle of operation as the nozzles 122 and 123 described hereinabove, except that the slot nozzles in devices 140 and 141 are arranged in a straight line instead of a ring. As a result, the output flow from curtain devices 140 and 141 occurs in a flat sheet or curtain. This shape is ideal wherever sheets or webs of material, such as glass, metal, paper or plastic film must be cooled, dried or cleaned.

It should be noted that the curtain air cooling device 140 has two slots 142 and 143 which produce converging air flow patterns 144 and 145, respectively, which merge to form an air flow pattern 146, which in turn spreads out as indicated by flow pattern lines 147, 148.

Curtain air cooling device 141 shown in FIG. 32 has a single central slot 149 which produces the air flow patterns 150, 151 and 152 as indicated in FIG. 32.

It should be noted that for curtain air cooling devices 140 and 141, all induction and entrainment of air flow takes place outside of the devices 140, 141.

For the sake of brevity, the detailed internal and external structure of devices 122, 123, 140 and 141 will not be set forth because such structure is known to the aritsan in view of somewhat similar devices currently available. For example, devices 122 and 123 are somewhat similar to Model 900 FLO-GAIN Nozzle sold by Vortec Corporation of Cincinnati, Ohio. Devices 140 and 141 are somewhat similar to Curtain Transvectors also sold by Vortec Corporation of Cincinnati, Ohio. The devices of Vortec Corporation are believed to be described in detail in U.S. Pat. Nos. 3,173,273, 3,208,229, 2,654,768 and 4,046,492, the complete disclosures of which are incorporated herein by reference thereto.

In a preferred embodiment of the invention, the secondary quench section 121 shown in FIG. 1 may include the quench jet assemblies 100 as shown in FIGS. 24a-28. Alternatively, the secondary quench section 121 may include the quench jet assemblies 14 and 15.

As a further alternative, the secondary quench section 121 may include high flow, low suction air cooling devices which use a less pressure than the primary quench section 120, while delivering sufficiently large quantities of air coolant. A suitable such air cooling device may, for example, be Model 952, 953 or 954 Transvector Air Flow Amplifier sold by Vortec Corporation of Cincinnati, Ohio. In this connection, and in connection with the devices 122, 123, 140 and 141 mentioned hereinabove, there is reincorporated herein by reference thereto the Vortec Corporation patent disclosures mentioned above, and there is also incorporated herein by reference thereto the following publications of Vortec Corporation of Cincinnati, Ohio: "TRANSVECTOR, SELECTION GUIDE DIMENSIONAL INFORMATION PRICE LIST," dated Feb. 1, 1979; "BLOW OFF", brochure copyrighted 1978; "TRANSVECTOR AIR FLOW AMPLIFIERS," brochure copyrighted 1979; "VORTECNOLOGY APPLICATION NOTES," brochure copyrighted 1979; "A SHORT COURSE ON TRANSVECTOR AIR FLOW AMPLIFIERS APPLICATION NOTES," brochure copyrighted 1976.

In summary, when the workpiece or glass moves from the heating section to the cooling section, the cooling section will consist of a primary quench section having one or more high pressure air cooling devices, such as, for example, 122, 123, 140, 141 Vortec Model 900 FLO-GAIN Nozzle, and/or Vortec Model 961, 962 or 963 Curtain Transvectors, which will perform at high pressures and at much lower noise levels than present systems. From the primary quench section 120, the workpiece would be transferred to the secondary quench section 121 which may include a blower and an array of quench jet assemblies, such as, for example, assemblies 14, 15 and/or 100, which may be operated at much lower pressures with a proportionately lower noise level. Alternatively, the secondary quench section 121 may include air cooling devices which would use less pressure while delivering greater quantities of coolant, such as, for example, TRANSVECTORS AIR FLOW AMPLIFIERS Models 952, 953 or 954 of Vortec Corporation of Cincinnati, Ohio. After the workpiece or glass has sufficiently cooled, it continues into the unload section from which the finished product may be removed from the equipment.

The infra red radiant electrical heaters 93 and 94 mentioned hereinabove may take any of several alternate forms such as the infra red radiant electrical heaters 160, 161, 162, 163, 164 or 165 as shown in FIGS. 33, 34, 35 and 36. Before describing such figures and the heaters shown therein, some general explanation of electrical radiant energy heating will be set forth.

Radiant energy as a means of heat processing has characteristics which are basically different from other types of heat sources. While convection heat (re-circulated or stagnant) is heated up air in an enclosure and held to the desired (and constant) temperature necessary to perform the operation on a saturation base, an infra red radiant heat source works by impact. Therefore, an infra red radiant heat source is always considerably much hotter than the required temperature on the workpiece to be processed. In order to obtain the required heat level on the workpiece, the time of exposure to the radiant heater must be considered.

An infra red radiant heater emits power with a characteristic electromagnetic emission which is measured by microns. This power is directly related to the wattage density of the infra red radiant body. The higher the wattage density, the higher the heat energy or the impact and the shorter the emitted wavelength. This wavelength is important and sometimes even critical because each material, no matter what it consists of, has characteristic heat absorption factors all its own. If this absorption factor is met by infra red radiant energy, an efficient and fast way of heat processing will be achieved.

With reference to FIG. 1, in order to reduce heat loss, the electrical infra red radiant heaters 93 and 94, or alternatively the heaters 160-165 shown in FIGS. 33-36 should be as close to the workpiece or glass 29 as possible. Thus the dimension "y" shown in FIG. 1 is actually much shorter with the use of electrical radiant heaters.

Figure 33:
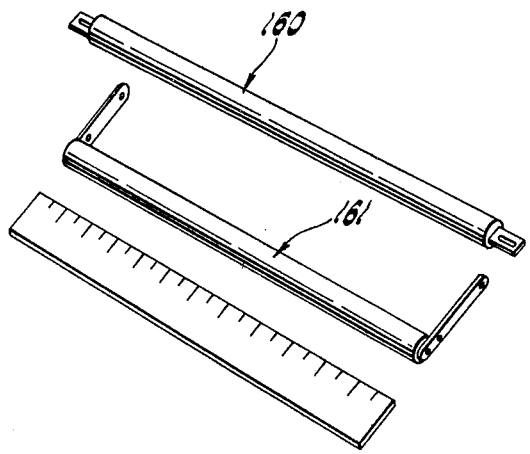
FIGS. 33, 34, 35 and 36 illustrate alternate forms of radiant electrical heating elements for use in connection with the present invention.

FIG. 33 shows two unidirectional tubular quartz heaters 160 and 161. These radiant electrical heaters 160 and 161 combine the efficiency of a flat quartz heater with an internal refractory reflector to produce a highly efficient, directional heat pattern. Eighty per cent (80%) of the generated radiant energy is effectively directed at the workpiece in process by heater 160 or 161. Heater 160 or 161 requires only a fraction of the space consumed by tubes using conventional reflectors, eliminating reflector maintenance, and supplies even heat over its entire effective heating length. No cooling off of terminals is required, and the terminals are available as either straight, as shown in heater 160, or 90° tabs, as shown in heater 161. Technically, heater 160 or 161 can, for example, produce up to 70 watts per square inch of usable energy.

Figure 34:
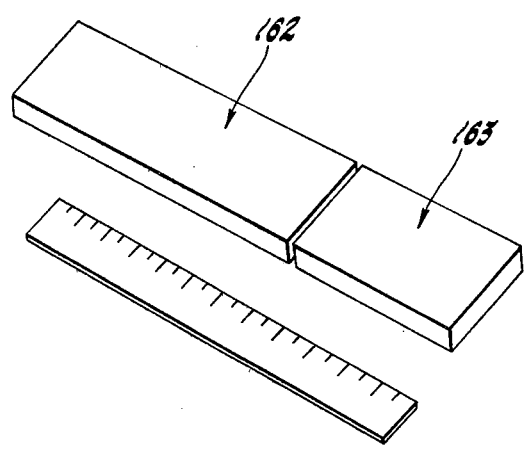

FIG. 34 shows compact quartz electrical heaters 162 and 163 which are directly interchangeable with the common porcelain or ceramic-type heaters. The heater 162 or 163 is designed for rapid, low-cost infrared heat, and each heater will produce 20% to 40% greater radiant output for the same power input, and without an increase in size.

Figure 35:
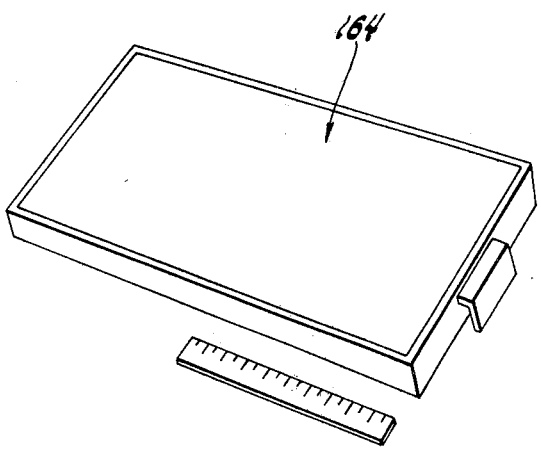

FIG. 35 shows a triple-power radiant heater 164 which eliminates the problems of re-radiation by inlaying the heating elements right in the quartz. The energy wave form is such that it corresponds very closely to the heat absorption characteristics of most materials. Heater 164 eliminates the need for heat dissipating reflectors which are commonly used in certain radiant heating systems. Temperatures up to 1800° F. are attainable, giving a tunable emission range from 2.4 to 6 microns of energy densities to 40 watts per square inch.

Figure 36:
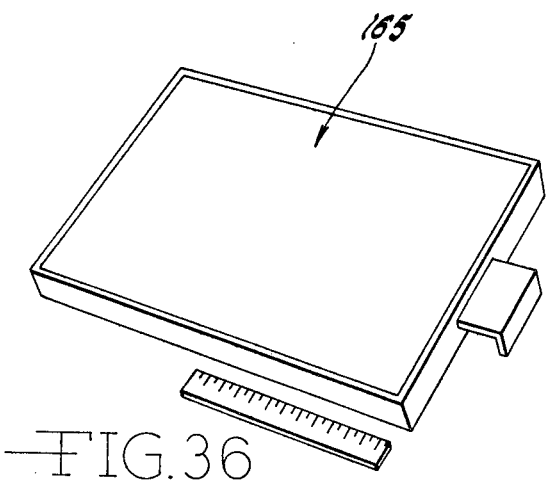

FIG. 36 shows a flat quartz infrared heater 165. The heater 165 is eminently suitable for both low and medium radiant heating applications. The heater 165 is designed as a rugged heater which will withstand the kind of treatment that would shatter conventional glass surfaced heaters. The heating coils for the heater 165 are cast directly into the quartz plate in sizes up to 4 square feet. Like the other radiant heaters mentioned hereinabove, the radiant heater 165 is tunable to the required heat level and will maintain its output to plus or minus 2° F. Temperatures to 1100° F. are attainable, as can be accurately controlled by many conventional control devices.

With respect to the radiant heaters 160—165 mentioned hereinabove, there is hereby incorporated by reference thereto the following two publications by CASSO-SOLAR Corporation of Kew Gardens, N.Y.: a four-page write-up entitled "APPLIED RADIANT HEAT WITH THE SOLAR HEATER" dated Jan. 1, 1976; and a four-sided brochure entitled "THE SOLAR HEATER, THE SOURCE FOR INFRARED ENERGY".

With reference to FIGS. 24a-28, it should be noted that a series of assemblies 100 will normally be used. To achieve full coverage for the workpieces, it is best to stagger alternate assemblies 100 so that the workpiece portions which first move under a spacer element 103 will then move under a tube 110 of the next adjacent assembly 100.

Various modifications and changes in the preferred embodiments subscribed hereinabove will occur to the artisan. The present invention embraces all such modifications and changes, and should only be limited within the scope of the appended claims.

I claim:

1. A glass tempering system comprising:
    a furnace including an upper furnace section and a lower furnace section defining a horizontally elongated heating chamber;
    a plurality of heating means disposed within said upper furnace section;
    first frame means for supporting said upper furnace section;
    second frame means for supporting said lower furnace section;
    a plurality of adjustable first roller support means disposed upon an upper surface of said second frame means;
    an endless flexible belt supported at least in part by said first roller support means;
    a plurality of first elongated ceramic rollers spaced along the length of said elongated heating chamber;
    said first elongated rollers being supported by said endless flexible belt, and extending into and through said heating chamber;
    said first elongated rollers being provided with nonmetallic cylindrical pins frictionally retained in apertures provided in either end of said elongated rollers coaxial with the axis of said rollers;
    adjustable guide members provided with at least one elongated aperture therethrough for receiving one said cylindrical pin retained in one said first elongated roller;
    a load section including third frame means connected to said second frame means;
    a plurality of said first adjustable roller support means disposed on an upper surface of said third frame means;
    said endless belt being supported upon said first adjustable roller support means;
    second elongated rollers driven by said endless belt;
    said second elongated rollers being provided with ends having a pin adapted to be rotatably received through an aperture of said adjustable guide member;
    primary and secondary quench sections including a plurality of said adjustable roller support means for supporting a portion of said endless belt; and
    said primary quench section including high flow, low suction air cooling devices;
    said secondary quench section including air cooling devices;
    drive means for said endless belt, including control means for causing said belt to alternately rotate said first and second elongated rollers in a first direction and then in an opposite direction for an electronically adjustable extent of rotation and for an adjustable speed of rotation, and to cause an extended unidirectional rotation of said first and second support rollers at an adjustable speed after a predetermined number of said alternate rotations, so that a sheet of glass placed upon said second elongated rollers in said load section will be conveyed into said heating chamber, adjustably oscillated at a plurality of predetermined locations within said furnace, conveyed to and oscillated within said quench sections, and conveyed to said unload section.

2. A glass tempering system according to claim 1, wherein:
    said upper furnace section, said lower furnace section; said first frame means, and said second frame means, comprise a plurality of modular sections firmly joined together to form a single unitary glass tempering unit.

3. A glass tempering system according to claim 1, wherein:
    said upper furnace section includes top and side sections;
    said top section of said upper furnace section is fixed to said first frame means; and
    said side sections of said upper furnace section are hingedly supported by said first frame means so that said side section may be raised to allow access to the interior of said heating chamber.

4. A glass tempering system according to claim 1, wherein:

said upper furnace section includes top and side sections;

said top section of said upper furnace section is raisably supported by said first frame means; and said side sections of said upper furnace section are slidably connected to said top section so that said side sections are not raised by upward movement of said top section until said top section engages an uppermost portion of said side sections.

5. A glass tempering system according to claim 1, wherein:

the length of said oscillation of said glass is substantially less than the length of said glass sheet.

6. A glass tempering system according to claim 1, wherein:

the length of said oscillation of said glass is substantially equal to the diameter of said first roller.

7. A glass tempering system according to claim 1, wherein:

each said second elongated roller includes a hollow tube, a plurality of flat-bottomed circumferential grooves, and cylindrical elastomeric washers retained in said grooves.

8. A glass tempering system according to claim 1, wherein:

said pins of said first elongated rollers are fabricated from non-metallic material.

9. A glass tempering system according to claim 1, wherein:

each said first elongated roller is provided with resilient sleeves at both ends thereof.

10. A glass tempering system according to claim 1, wherein:

said lower furnace section is provided with second heating means disposed therewithin; and said second heating means are fewer in number and lower in output than the heating means disposed within said upper furnace section.

11. A glass tempering system according to claim 1, including:

gate means disposed adjacent both ends of said furnace for substantially reducing a flow of air into said furnace; and said gate means being automatically raised during said extended unidirectional rotation of said support rollers so that sheets of glass may be conveyed into and out of said furnace.

12. A glass tempering system according to claims 1, 2, 3, 4, 5, 6, 7, 8, 9, 10 or 11, wherein:

said endless belt is fabricated from non-metallic material.

13. A glass tempering system according to claims 1, 2, 3, 4, 5, 6, 7, 8, 9, 10 or 11, wherein:

said endless belt comprises a woven heat-resistant fabric which is coated with a heat-resistant elastomeric material.

14. A glass tempering system according to any one of claims 1, 2, 3, 4, 5, 6, 7, 8, 9, 10 or 11, wherein:

said control means causes said endless belt to alternately rotate said first and second elongated rollers in a first direction and then in an opposite direction for an electronically adjustable extent of rotation and for an adjustable speed of rotation, and causes an extended unidirectional rotation of said first and second support rollers at an adjustable speed after a predetermined number of said alternate rotations.

15. A glass tempering system comprising:

first means upon which glass to be tempered is loaded for conveying said glass;

second means for heating said glass;

a primary quench section including high flow, low suction air cooling devices for cooling the heated glass;

a secondary quench section including air cooling devices for further cooling said glass;

an unload section from which the finished tempered glass is removed;

said frame means, said second means, said primary quench section, said secondary quench section, and said unload section being operably and mechanically interconnected so that said glass to be tempered is sequentially conveyed by said first means to said second means, to said primary quench section, to said secondary quench section, and finally to said unload section; and said first means for conveying said glass being arranged for reciprocal motion through said system and including control means for causing said first means to move in a first direction and then in a second reverse direction for predetermined equal periods, within a section, and also for predetermined variable periods to affect advancement of said conveying means from a load section through said quench sections and to an unload section with reciprocating movement of said conveyor within each said quench sections.

16. A glass tempering system according to any one of claims 1, 2, 3, 4, 5, 6, 7, 8, 9, 10, 11 or 15, wherein:

said secondary quench section includes high flow, low suction air cooling devices for further cooling said glass.

17. A glass tempering system according to claim 16, wherein:

said high flow, low suction air cooling devices amplify an input compressed air flow many times.

18. A glass tempering system according to claim 16, wherein:

said high flow, low suction air cooling devices use a small flow of compressed air to induce and entrain large flows of air from their surroundings.

19. A glass tempering system according to claim 16, wherein:

said high flow, low suction air cooling devices throttle a small flow of input compressed air through an extremely small orifice thereby propelling the air to sonic velocity.

20. A glass tempering system according to any one of claims 1, 2, 3, 4, 5, 6, 7, 8, 9, 10, 11 or 15, wherein:

said heating means includes solar heaters having a quartz surface.

21. A glass tempering system according to any one of claims 1, 2, 3, 4, 5, 6, 7, 8, 9, 10, 11 or 15, wherein:

said heating means includes unidirectional tubular quartz heaters.

22. A glass tempering system according to any of claims 1, 2, 3, 4, 5, 6, 7, 8, 9, 10, 11 or 15, wherein:

said heating means includes solar heaters which have quartz elements that are virtually transparent to infrared emission.

23. A glass tempering system according to any one of claims 1, 2, 3, 4, 5, 6, 7, 8, 9, 10, 11 or 15, wherein:

said heating means includes a radiant heater.

24. A glass tempering system according to any one of claims 1, 2, 3, 4, 5, 6, 7, 8, 9, 10, 11 or 15, wherein:

said heating means includes radiant electrical heaters having quartz elements which are virtually transparent to the infrared energy created within such quartz elements.

25. A glass tempering system according to any one of claims 1, 2, 3, 4, 5, 6, 7, 8, 9, 10, 11 or 15, wherein:

at least one of said quench sections includes quench assemblies comprising outer sheet members between which there are spot welded an alternating series of spacer elements.

26. A method of heating and quenching a workpiece, comprising the steps of:

placing a workpiece upon a load conveyor;

moving said workpiece into a heating section for a predetermined period of time;

moving said workpiece from the heating section into a primary quench section;

cooling the heated workpiece in the primary quench section by subjecting the heated workpiece to the air flow produced by one or more high flow, low suction air cooling devices;

moving said workpiece into a secondary quench section for further cooling said workpiece;

moving said workpiece into an unload section;

unloading the finished workpiece; and wherein said workpiece is reciprocated within said heating and said primary quench and said secondary quench sections for predetermined periods over distances substantially less than the length of the workpiece being treated.

27. A method according to claim 26, wherein:

said workpiece in said primary quench sections is cooled by subjecting said workpiece to an air flow produced by throttling an input of compressed air through an extremely small orifice to cause the air to attain sonic velocity.

28. A method according to claim 26 or 27, wherein:

said workpiece is heated by exposing said workpiece to the radiant energy emitted by electrical heaters having quartz heating elements which are virtually transparent to infrared energy created therein.

29. A system for heating and quenching a workpiece, comprising:

a furnace including an upper section and a lower section defining a horizontally elongated heating chamber;

a plurality of heating means disposed within the upper furnace;

first frame means for supporting said upper furnace section;

second frame means for supporting said lower furnace section;

a plurality of adjustable first roller support means disposed upon an upper surface of said second frame means;

an endless flexible belt supported at least in part by said first roller support means;

a plurality of first elongated ceramic rollers spaced along the length of said elongated heating chamber;

said first elongated rollers being supported by said endless flexible belt, and extending into and through said heating chamber;

said first elongated roller is being provided with non-metallic cylindrical pins frictionally retained in apertures provided in either end of said elongated rollers coaxial with the axis of said rollers;

adjustable guide members provided with at least one elongated aperture therethrough for receiving one said cylindrical pin retained in one said first elongated roller;

a load section including third frame means connected to said second frame means;

a plurality of first adjustable roller support means disposed at an upper surface of said third frame means;

said endless belt being supported upon said first adjustable roller support means;

second elongated roller supported by said endless belt;

said second elongated roller is being provided with ends having a pin adapted to be rotatably received through an aperture of said adjustable guide member;

primary and secondary quench sections including a plurality of said adjustable roller support means for supporting a portion of said endless belt;

said primary quench section including high flow, low suction air cooling devices;

said secondary quench section including air cooling devices; and drive means for said endless belt.

30. A system according to claim 29, wherein:

said secondary quench section includes high flow, low suction air cooling devices for further cooling said glass.

31. A system according to claim 29 or 30, wherein:

said high flow, low suction air cooling devices amplify an input compressed air flow many times.

32. A system according to claim 29 or 30, wherein:

said high flow, low suction air cooling devices use a small flow of compressed air to induce and entrain large flows of air from their surroundings.

33. A system according to claim 29 or 30, wherein:

said high flow, low suction air cooling devices throttle a small flow of input compressed air through an extremely small orifice thereby propelling the air to sonic velocity.

34. A system according to claim 29 or 30, wherein:

said heating means includes solar heaters having a quartz surface.

35. A system according to claim 29 or 30, wherein:

said heating means includes unidirectional tubular quartz heaters.

36. A system according to claim 29 or 30, wherein:

said heating means includes solar heaters which have quartz elements that are virtually transparent to infrared emission.

37. A system according to claim 29 or 30, wherein:

said heating means includes a radiant heater.

38. A system according to claim 29 or 30, wherein:

said heating means includes radiant electrical heaters having quartz elements which are virtually transparent to the infrared energy created within such quartz elements.

39. A system according to claim 29 or 30, wherein:

at least one of said quench sections includes quench assemblies comprising outer sheet members between which there are spot welded an alternating series of spacer elements.

* * * * *